United States Patent [19]

Ikedo et al.

[11] Patent Number: 4,926,406
[45] Date of Patent: May 15, 1990

[54] DISK PLAYER

[75] Inventors: Yuji Ikedo; Tsutomu Miyakawa, both of Tokyo; Takahiro Okajima; Masahiko Miyake, both of Saitama, all of Japan

[73] Assignee: Pioneer Electronic Corporation, Tokyo, Japan

[21] Appl. No.: 884,949

[22] Filed: Jul. 14, 1986

[30] Foreign Application Priority Data

| Jul. 12, 1985 | [JP] | Japan | 60-153651 |
| Jul. 12, 1985 | [JP] | Japan | 60-153652 |
| Jul. 12, 1985 | [JP] | Japan | 60-153653 |
| Jul. 12, 1985 | [JP] | Japan | 60-153654 |
| Jul. 12, 1985 | [JP] | Japan | 60-153655 |
| Jul. 12, 1985 | [JP] | Japan | 60-153656 |

[51] Int. Cl.$^5$ .............. G11B 17/22; G11B 19/10; G11B 33/04
[52] U.S. Cl. .................................. 369/36; 369/39
[58] Field of Search .............................. 369/36, 38, 39

[56] References Cited

U.S. PATENT DOCUMENTS

| 2,725,235 | 11/1955 | Hull et al. | 369/39 |
| 4,170,030 | 10/1979 | Castrodale et al. | 369/38 |
| 4,616,357 | 10/1986 | Nakayama | 369/36 |
| 4,653,037 | 3/1987 | Nakayama et al. | 369/38 |
| 4,691,309 | 9/1987 | Suzuki | 369/38 |
| 4,701,900 | 10/1987 | Hasegawa et al. | 369/39 |
| 4,730,292 | 3/1988 | Hasegawa et al. | 369/39 |

Primary Examiner—Steven L. Stephan
Attorney, Agent, or Firm—Sughrue, Mion, Zinn, Macpeak & Seas

[57] ABSTRACT

A multidisk player comprising a housing, a playback mechanism, a magazine capable of containing a plurality of disks arranged in order, the magazine being detachably fitted in a predetermined magazine loader within the housing, a single adapter detachably fitted in the loader, the single adapter being capable of being loaded replaceably with one disk, disk carrier means for carrying the magazine and the disk in the single adapter to a playback position, and a drive unit for driving the magazine and the single adapter outwardly from the loader, the single adapter comprising a first member directly fitted in the loader, a second member for being loaded with the disk, the second member being movable within a fixed range relative to the first member and along the direction where said first member is fitted in the loader, and a drive unit for driving the second member. The first member is driven out of said loader when the second member is moved relative to the first member such that the sum of the quantity of the protrusion of the first member from the loader and that of the movement of the second member relative to the first member is slightly greater than the outer diameter of the disk.

6 Claims, 22 Drawing Sheets

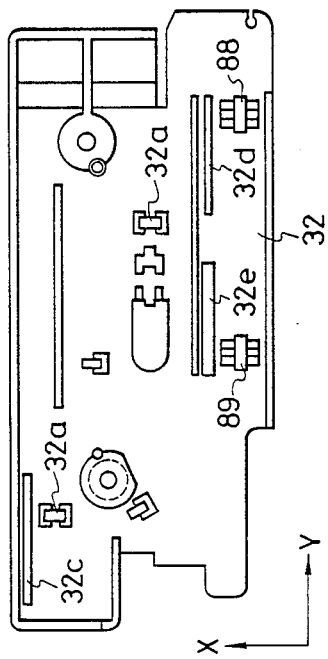
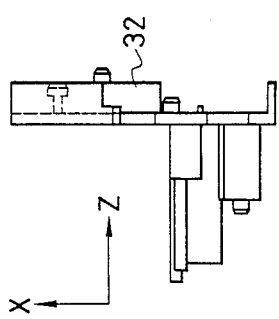

DISK PLAYER

BACKGROUND OF THE INVENTION

This invention relates to a multidisk player capable of containing a plurality of disks, successively selecting any one of the disks contained and continuously replaying them.

Jukeboxes are generally known to be typical of disk players capable of continuously replaying a plurality of disks. However, the conventional jukebox has an extremely large body and is thus unsuitable for home use.

Several kinds of disks known as digital audio disks (DADs) have recently been developed and have been utilized widely. In comparison with conventional audio disks storing analog signals, DADs designed to record digital signals are capable of storing a larger quantity of data and producing less noise at the time of playback. Of the DADs, one about 12 cm in diameter, generally known as a compact disk for recording signals by means of a laser beam, is easy to handle and enables reduction of the size of a disk player as a whole. A multidisk player also recently developed can normally contain a plurality (e.g., 5 or 6) of compact DADs and can continuously replay them. Accordingly, such a multidisk player is most suitable as a jukebox for home use. The compact DAD provides one hour of playback time, which is about 1.5 times what is offered by the conventional analog audio disk. In consequence, 6 disks can store, e.g., 120 pieces of music, provided that each requires about 3 minutes for playback, and also readily cover jazz and popular ballads on a category basis.

A multidisk player basically comprises a playback means including a turntable and a pickup, a magazine for containing a plurality of disks arranged in order at a predetermined pitch and a disk carrier mechanism for successively selecting any one of the disks contained in the magazine and carrying the disk to a playback position, i.e., onto the turntable.

In the case of the multidisk player already developed, it is necessary to take the magazine not containing disks stored with pieces of music desired, e.g., jazz, out of the player housing and replace the magazine with another containing disks stored with the pieces desired; or to substitute another disk stored with the pieces desired for the disk stored with the pieces undesired and contained in the magazine, which is taken out of the player housing and put the magazine back into the player housing. When there are several disks stored with the pieces desired, moreover, this replacement operation must be repeated for each disk. Such inferior operability relating to disk replacement has caused inconvenience to listeners.

With a view to improving operability as to the placement and replacement of a disk, there has newly been developed a multidisk player equipped with a single adapter detachably added to a magazine loader installed in the player body and used to contain one disk, which is replaceable thereby. FIG. 29 shows a schematic view of the single adapter thus developed, whereas FIG. 30 shows a multidisk player in such a state that the single adapter is fitted after a magazine (not shown) is pulled out. As shown in the drawings, the single adapter 130 comprises a first member 133 directly fitted in a magazine loader 132 installed in a player body 131, a second member 135 for being loaded with a disk 134, the second member 135 being movable relative to the first member 133 along the direction (of arrow H) where the first member 133 is fitted in the loader 132, and a driving means (not shown) such as a coil spring for outwardly driving the second member 135. The player body 131 is also equipped with a thrusting means (not shown) for thrusting the magazine (not shown) and the single adapter 130 out of the loader 132 when both of them are replaced.

The operation of the above single adapter 130 will be described briefly in accordance with the procedure for loading the disk thereon.

When an operating button (not shown) is pressed, the driving means causes, as shown in FIG. 30, the second member 135 to move relative to the first member 133 and drives the second member 135 out of the player body 131. The thrusting means will not be operated at that time and the first member 133 is still fixed to the loader 132. When the second member 135 is driven out of the player 131, the disk 134 is placed on the disk loading face 136 of the second member, which is then pushed back into the player body 131 with a finger. Disk loading thus is completed.

As set forth above, the outer diameter D of the disk 134 is about 12 cm (120 mm) and therefore the quantity S of the protrusion of the second member 135 required for the installation of the disk is slightly greater than D, e.g., 125 mm. On the other hand, the outer diameter Q of the single adapter 130 in the direction H where it is installed roughly equal to the depth of the loader 132 to make the adapter compact. Consequently, the length Q-S wherein the first and second members 133, 135 are overlapped is set relatively small when the second member 135 is protruded. As shown in FIG. 30, a moment because of a load W is applied to the portion where the first and second members 133, 135 are overlapped (the portion indicated by Q-S) when, e.g., the load W is applied to the prescribed position of the second member while the second member 135 is protruded. However, the value obtained by Q-S is small, the strength of the portion is small and may readily be deformed or damaged.

SUMMARY OF THE INVENTION

The present invention is intended to solve the above problems and it is therefore an object of the invention to provide a multidisk player with a single adapter sufficiently resistive to external force unexpectedly applied thereto.

The multidisk adapter according to the present invention includes a means for protruding a magazine and a single adapter from a predetermined magazine loader provided in a housing for receiving the magazine and the single adapter, the single adapter comprising a first member directly installed in the loader, a second member loaded with a disk and movable within a fixed range along the direction where the first member is load in the loader, and a means for providing the second member with moving force, the first member being protruded from the loader when the second member is moved relative to the first member. The invention is characterized in that the sum of the quantity of the protrusion of the first member from the loader and that of the movement of the second member relative to the first member is set slightly greater than the outer diameter of the disk.

BRIEF DESCRIPTION OF THE DRAWINGS

FIGS. 11(a) through 23 are detailed views showing the partial detailed structure of the multidisk player;

DESCRIPTION OF THE PREFERRED EMBODIMENTS

Referring now to the accompanying drawings, a multidisk embodying the present invention will be described.

Figure 1:
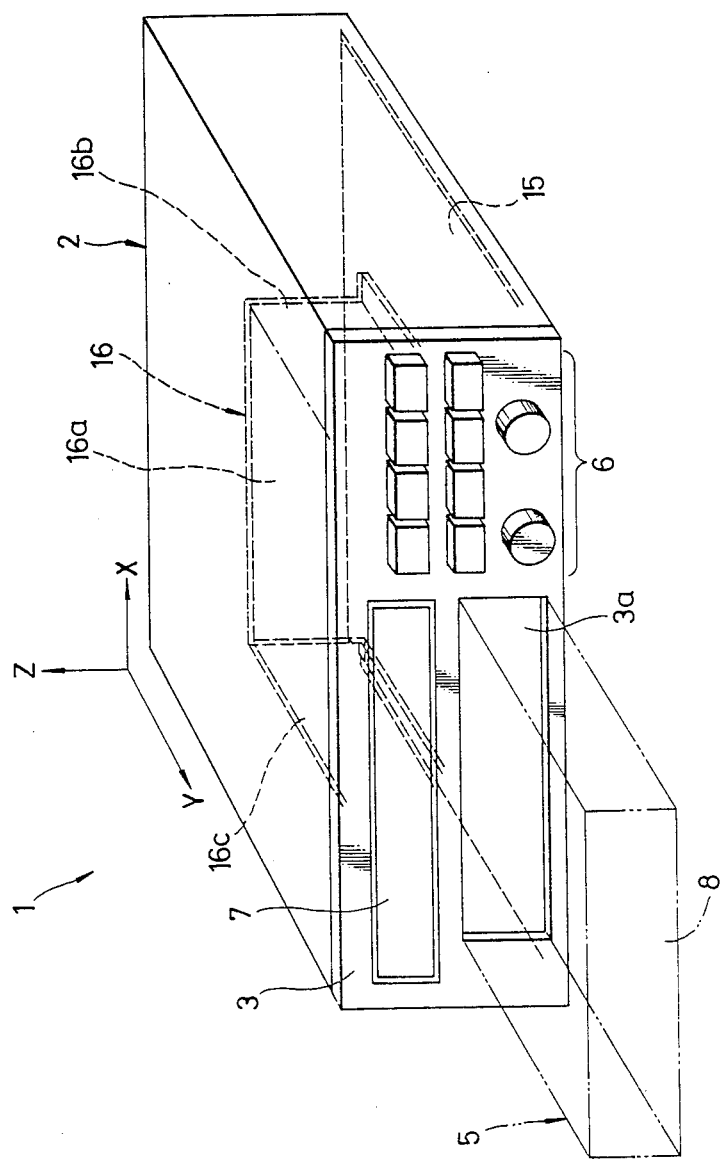
FIG. 1 is a schematic view of a total multidisk player embodying the present invention.

In FIG. 1, which is a general view of the above multidisk player represented by numeral 1. A rectangular opening 3a in a front panel 3 of a housing 2, which is extended in the lateral direction, is used to load a magazine 5 in the housing 2. The lateral direction is perpendicular to what is shown by an arrow Y and the direction shown by an arrow X is pointed to the right. An arrow Z is pointed upward. A group of buttons 6 for operating the multidisk player and a display means 7 are installed on the front panel 3.

Figure 2A:
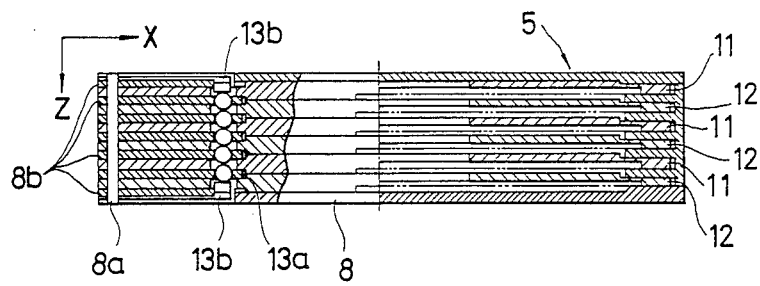
FIGS. 2(a) through 5 are views explanatory of the magazine.

As shown in FIGS. 2(a), (b), the magazine 5 is equipped with a totally flat, rectangular parallelepiped magazine body 8 and two kinds of three rectangular plate-like trays 11, 12, i.e., six trays in total, each being loaded with a disk 10 on its principal surface. The trays 11, 12, i.e., the disks 10 are arranged in order in the direction perpendicular to the disk loading face of a turntable, which will be described later, i.e., in the vertical direction in this case (opposite the direction of arrow Z) at a fixed pitch. The trays 11, 12 are made rotatable about a rotary support axle 8a installed at the right rear end of the magazine body 8, the support axle 8a being extended in the vertical direction (where each tray is arranged). The trays 11, 12 are also protrudible from and retractable into the magazine body 8 along their principal surfaces, respectively.

The construction of the magazine 5 now will be described specifically.

Figure 3:
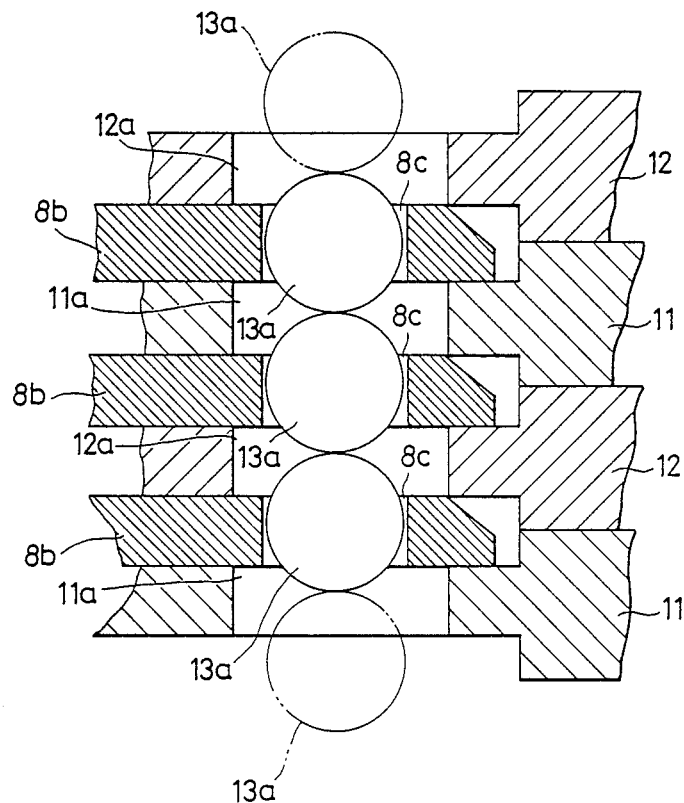
Figure 4:
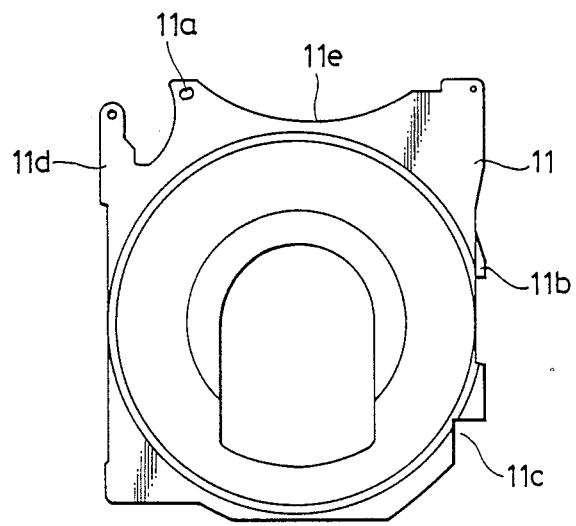
Figure 5:
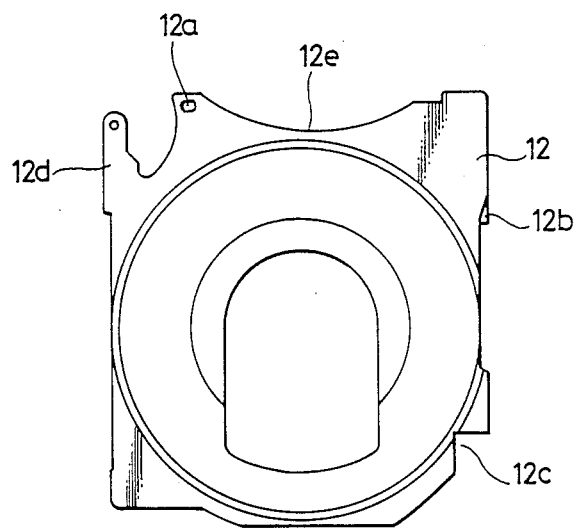

The magazine body 8 is provided with seven partitions 8b arranged in rows in the vertical direction (along the direction of arrow Z) and each of the trays 11, 12 is arranged therebetween. As is obvious from FIG. 3, a small circular concentric aperture 8c is formed close to the rotary support axle 8a in each partition 8b. FIGS. 4 and 5 show the trays 11, 12 in detail. As shown in FIGS. 4 and 5, the trays 11, 12 have apertures 11a, 12a formed opposite the aperture 8c formed in each partition 8b. The aperture 8c formed in the partition 8b is hereinafter referred to as a first aperture, whereas the apertures 11a, 12a provided in the trays 11, 12 are referred to as a second aperture. In the apertures 8c, 11a, 12a are fitted five spherical moving pieces 13a movable along the direction of arrow Z where the partitions 8b are arranged in parallel, respectively. The diameter of each spherical moving piece 13a is equal to the pitch dimension according to which the trays 11, 12 are alternately arranged. Moreover, the spherical moving pieces are energized by a pair of leaf springs 13b arranged at both upper and lower ends of the magazine body 8 in the direction where they are brought close to each other.

Figure 2B:
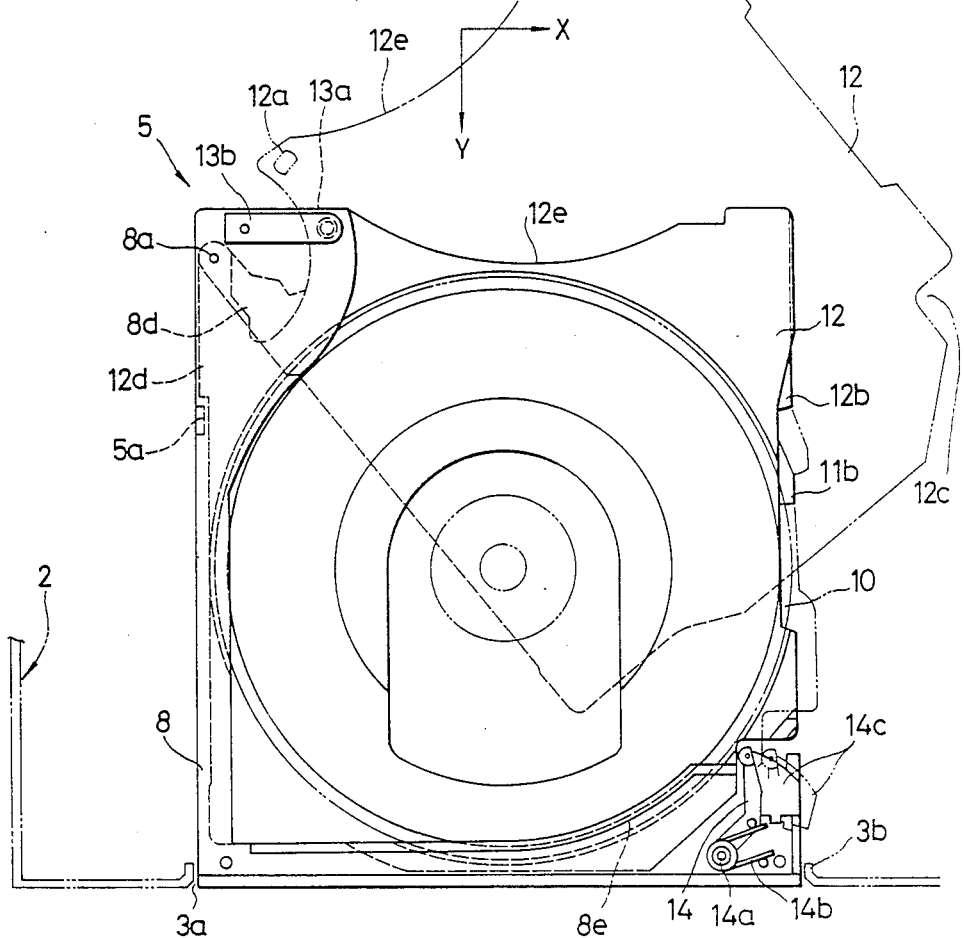

As shown in FIG. 2(b), a presser lever 14 extended in the roughly longitudinal direction (arrow Y). Is installed at the front left end of the magazine body 8 and one oscillating end, i.e., the front end thereof is fixed to the magazine body 8 through a pin 14a. The pin 14a is also extended in the direction of arrow Z. The other end of the presser lever 14, i.e., the rear end thereof is allowed to mate smoothly with the free end of each of the trays 11, 12. A spring member 14b is caused to engage with the presser lever 14. The spring member 14b is used to energize the presser lever 14 counterclockwise as shown in FIG. 2(b) and cause the lever to press the tray. A boss 14c capable of butting the edge 3b of the opening 3a of the housing when the magazine 5 is detached from the magazine loader within the housing is formed on the presser lever 14. The boss oscillates the body of the presser lever 14 so as to energize the trays 11, 12 toward the tray receiving positions within the magazine body 8 by butting against the edge 3b of the opening 3a.

The above presser lever 14 and the spring member 14b constitute a presser means, whereas the presser means, the aperture 8c (the first aperture) formed in each partition of the magazine body 8, the apertures 11a, 12a (the second apertures) formed in the corresponding tray 11, 12, each spherical moving piece 13a, and the leaf spring 13b constitute a holding mechanism for holding the tray 11, 12 in the positions where they are received in the magazine body 8.

As shown in FIGS. 4 and 5, the trays 11, 12 are roughly the same in shape but different in terms of the shapes and positions of claws 11b, 12b for being hooked by the finger when the listener takes each tray out of the magazine body 8. Moreover, cuts 11c, 12c are formed at the free ends of the trays 11, 12 with which the presser lever 14 engages.

As shown in FIG. 1, a chassis 16 as a support member is installed on a bottom plate 15 fixed to the housing 2. The chassis 16 is formed of a plane 16a extending X and Y axes and a pair of elevated planes 16b, 16c contiguous to both lateral ends of the plane 16a and extending along the Z axis, i.e., in the direction where the trays are arranged.

As shown in FIGS. 6 through 10, a moving member 18 is installed between the rear ends of the elevated planes 16b, 16c of the chassis 16 and is attached to the elevated planes movably in the vertical direction, i.e., in the direction where the trays 11, 12 are arranged. More specifically, the moving member 18 comprises a moving chassis 19 prepared from resin shown in FIGS. 11(a), (b) and a flat moving chassis 20 shown in FIG. 12, both chassis being connected with, e.g., screws. Notwithstanding, the moving chassis 19 is fixed to the surface of the moving chassis 20.

Figure 11A:
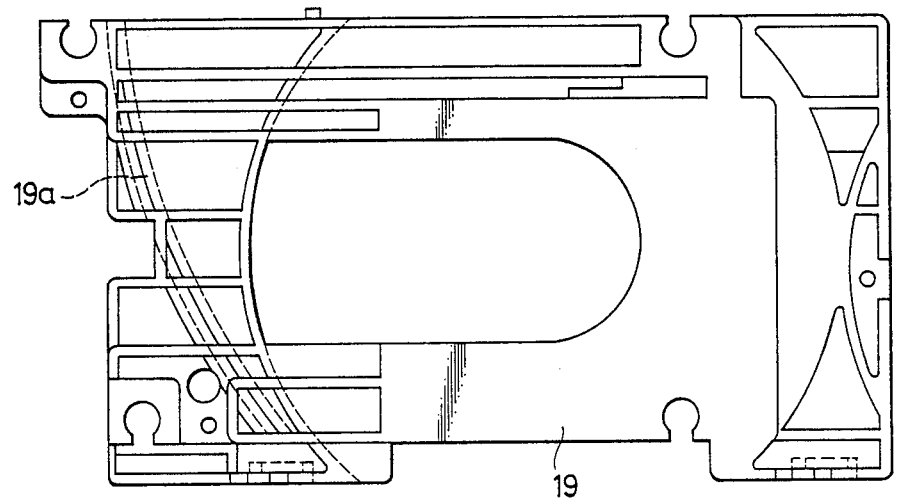
Figure 11B:
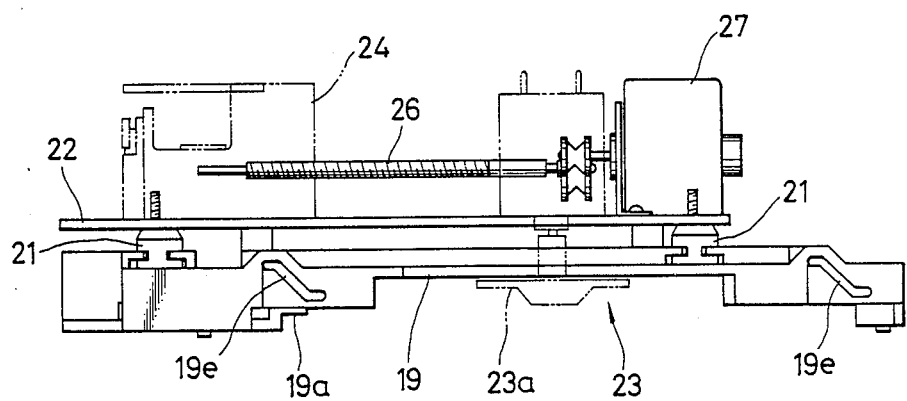

As is obvious from FIG. 11(b) in particular, a loading plate 22 is attached to the surface of the moving chassis 19 prepared from resin through a vibration insulator 21 such as rubber, and a turntable 23 is attached to the loading plate. A carriage 24 loaded with an optical pickup means is arranged on the loading plate 22 and movably fixed to the loading plate 22 along the plane including the disk loading face 23a of the turntable 23, i.e., along the X axis. Moreover, there is installed a carriage driving means for driving a carriage 24, the driving means comprising a screw shaft 26 engaging part of the carriage 24 and a motor 27 for supplying the screw shaft with rotational force.

The turntable 23, the carriage 24 including the optical pickup means and the carriage driving means constitute a playback means for replaying the disk. In other words, the playback means is supported by the moving member 18 and moved along the X axis.

Figure 12:
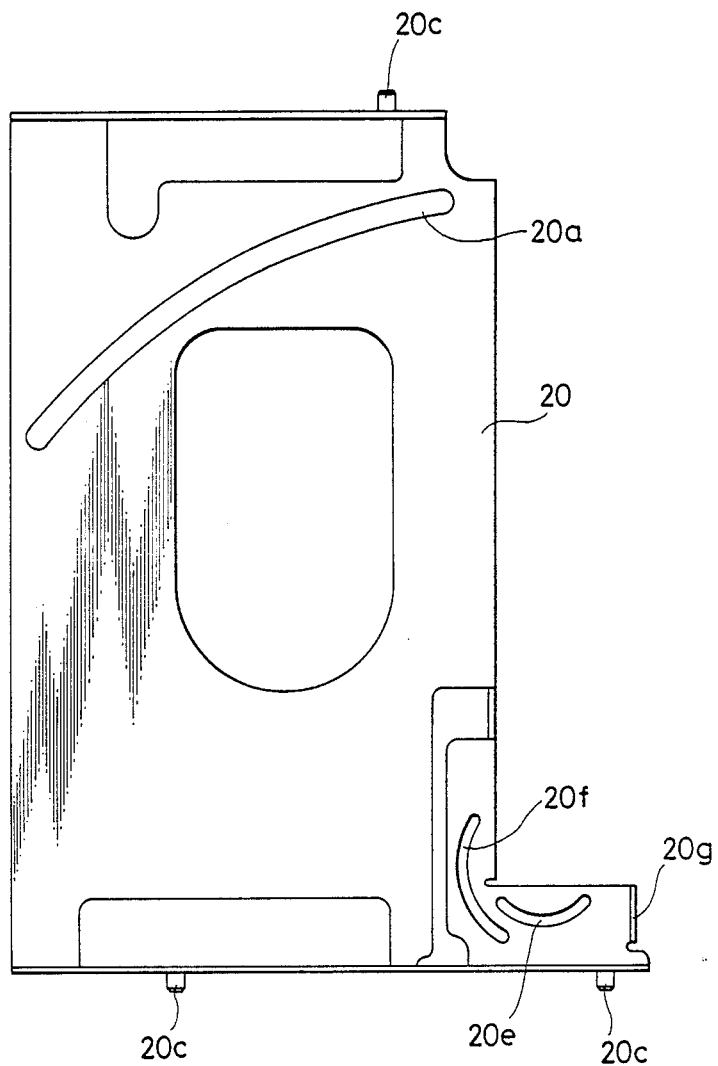

As shown in FIGS. 11(a), (b), there is formed an arcuate guide face 19a on the under surface of a moving chassis 19 which the rotary ends of the trays 11, 12 protruding from the magazine body 8 can slidably contact. As shown in FIG. 12, an arcuate guide boss 20a facing the arcuate guide face 19a with a space slightly greater than the thickness of each tray 11, 12 is formed on the moving chassis 20, the rotary end of each tray being capable of slidably contacting the arcuate guide boss 20a. The arcuate guide face 19a and the arcuate guide boss 20a constitute a tray guide for guiding a tray protruding from the magazine body 8.

Figure 6:
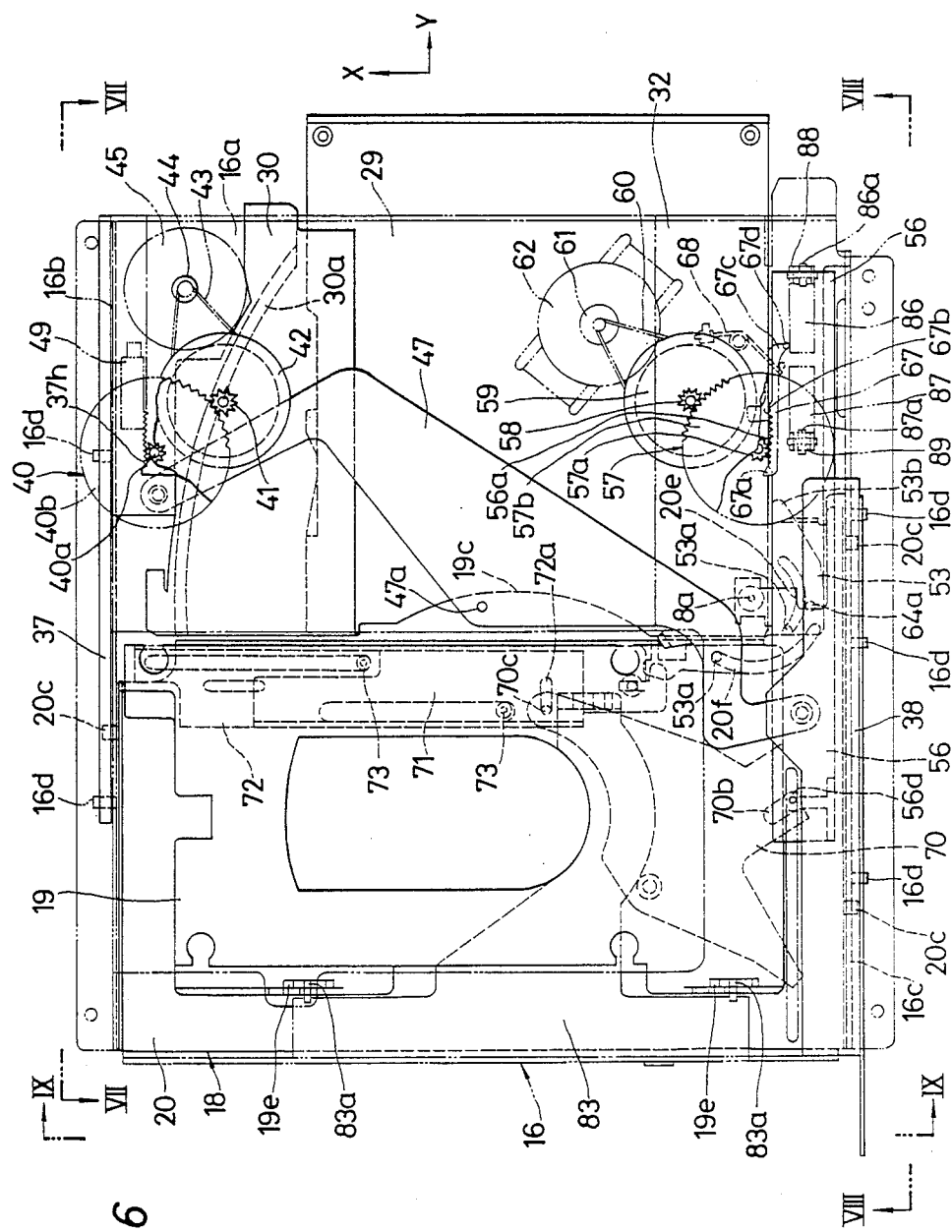
FIG. 6 is a plan view showing the internal structure of the multidisk player.
Figure 9:
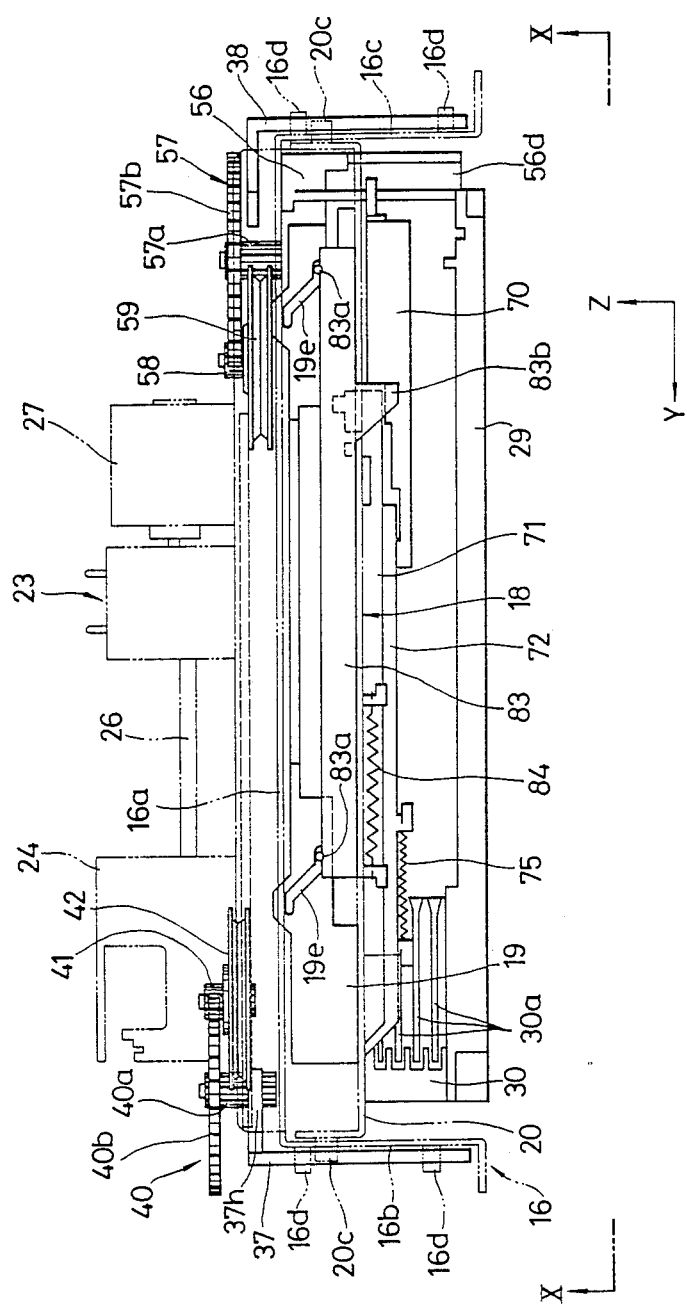
Figure 10:
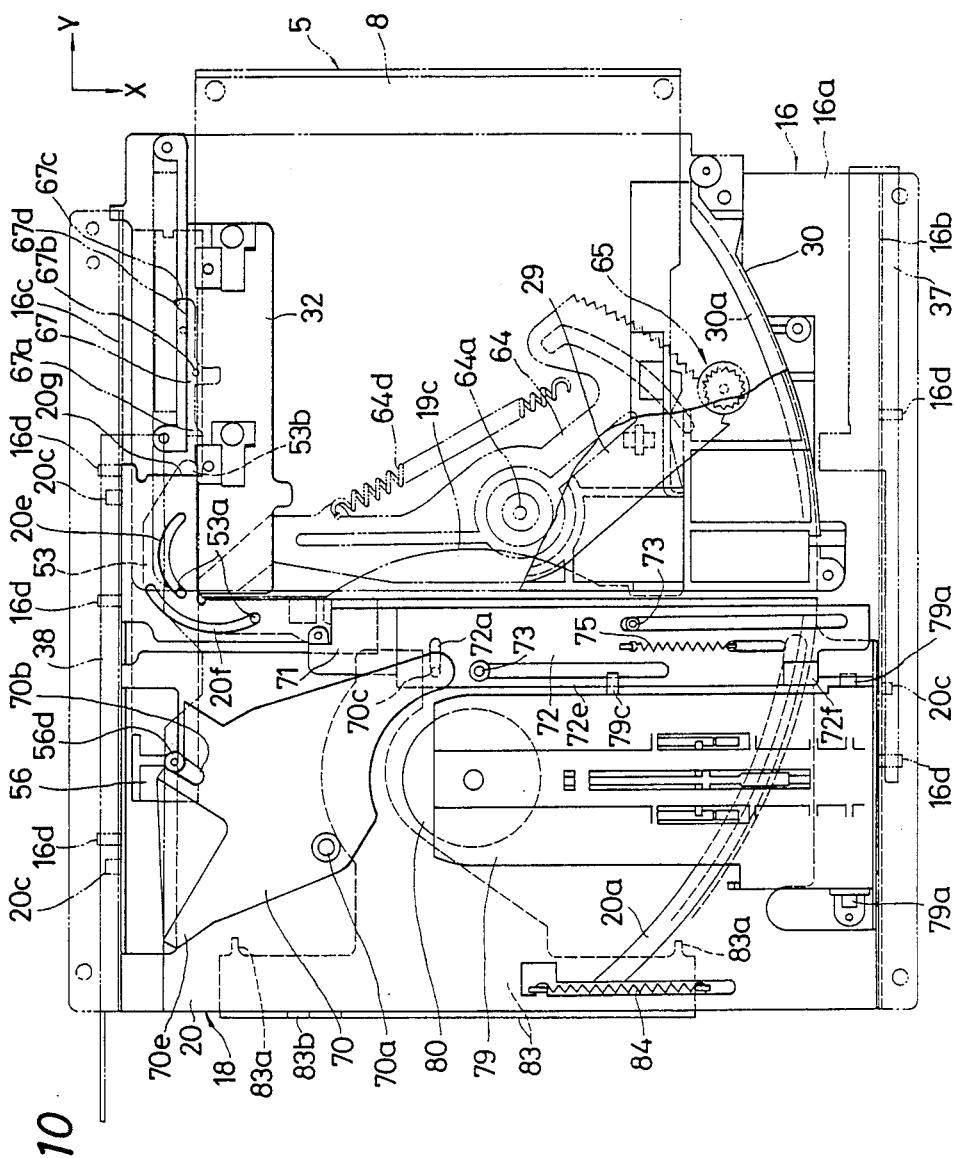
FIG. 10 is a view taken on line X—X of FIG. 9.
Figure 13:
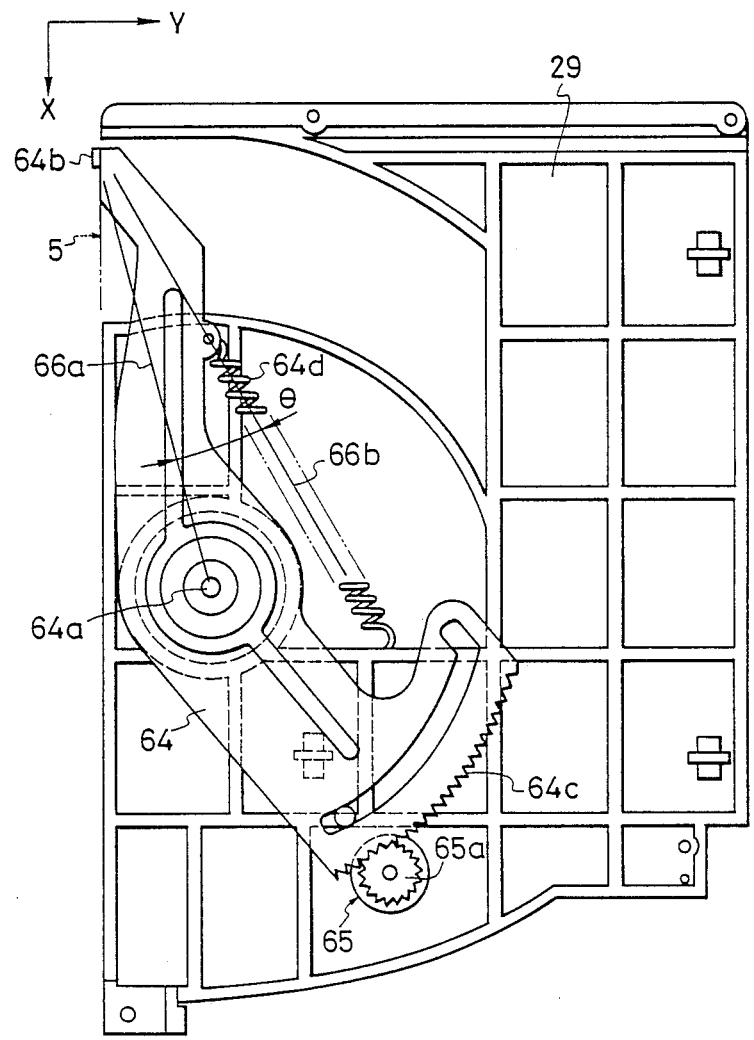

As shown in FIGS. 6, 9 and 10, a guide-hold member 29 for slidably contacting the under surface of the magazine 5 and guiding and holding the magazine is arranged between the front ends of the pair of elevated portions 16b, 16c of the chassis 16 and the guide-hold member 29 is fixed to the plane portion 16a of the chassis 16 with screws. FIG. 13 shows the guide-hold member 29 in detail. A tray guide member 30 is installed on the left end surface of the guide-hold member 29. A plurality of arcuate tray guide grooves 30a are positioned between the tray guide (consisting of the arcuate guide face 19a and the arcuate guide boss 20a) and the tray guide passage of the magazine body 8. In other words, the trays 11, 12 which produce from the magazine body 8 engage with the tray guide grooves 30a and are caused to slide along them and then are guided to the (above-described) tray guide of the moving member 18. The tray guide passages 8d, 8e of the magazine body 8 shown in FIG. 2(b) are provided with a plurality of guide grooves similar to the above-described guide grooves 30a.

Figure 14:
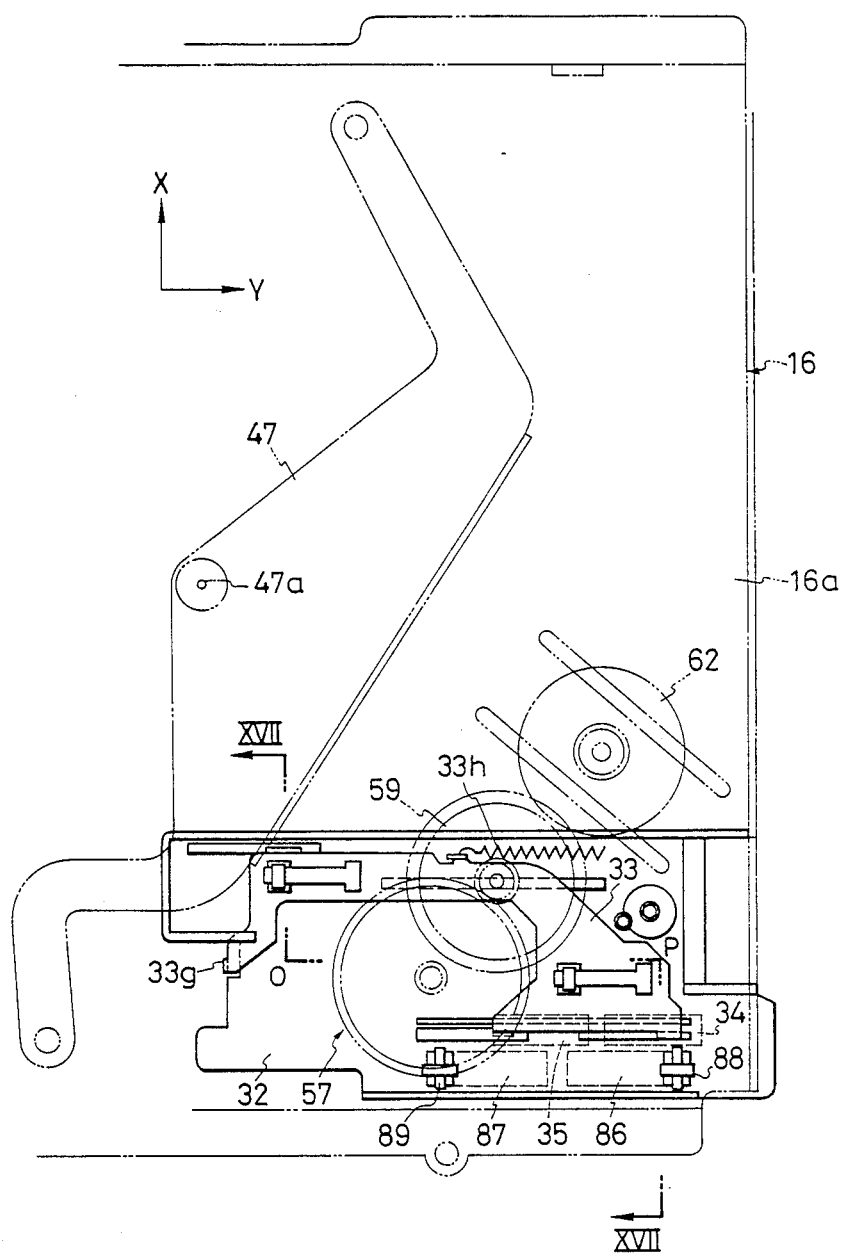
Figure 16A:
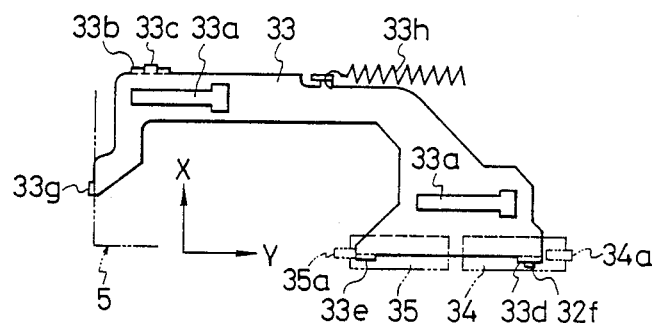
Figure 17:
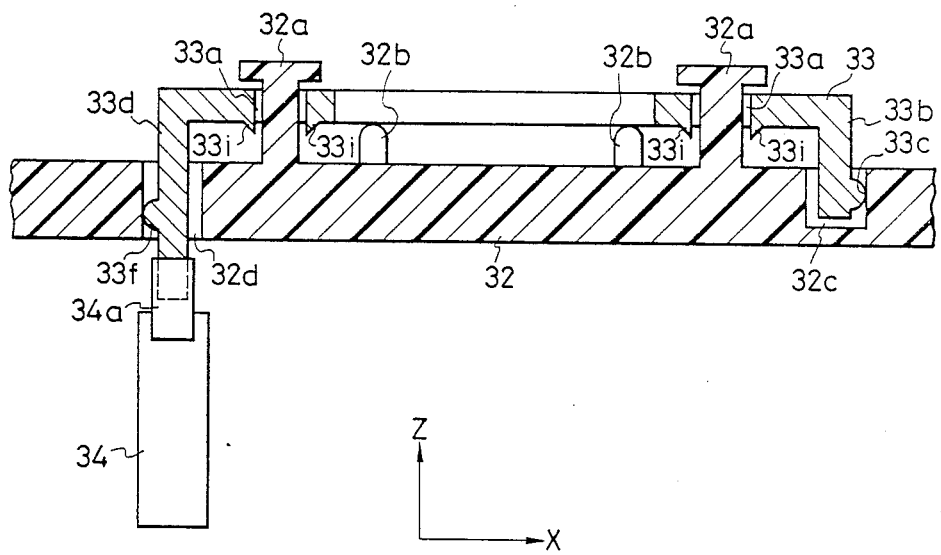

As shown in FIGS. 6, 10 and 14, a support 32 prepared from resin is arranged close to the magazine loader in the player housing, i.e., on the right-hand side of the magazine loader in this case, and is fixed to the plane 16a of the chassis 16. FIGS. 15(a) through (c) show the support 32 in detail. As shown in FIG. 14, a moving lever 33 made of steel sheet is movably installing on the surface of the support 32 along the magazine loading direction, i.e., along the Y axis. FIGS. 16(a) and (b) show the moving lever 33 in detail. As shown in FIGS. 15(a) through (c) and FIGS. 16(a) and (b), the moving lever 33 is fixed to the support as a pair of linear openings 33a extended in the longitudinal direction of the moving lever slidably mate with a T-shaped boss 32a of the support 32. As shown in FIG. 17, a boss 32b smoothly abutting the under surface of the moving lever 33 and used to support the moving lever is provided on the surface of the support 32.

An overhanging portion 33b extending downward is formed at the left rear end of the moving lever 33 and slidably fitted in the linear groove 32 extended and formed in the longitudinal direction on the left end surface of the support 32. Notwithstanding, a boss 33c is formed on the left side face of the overhanging portion 33b and smoothly abuts the left wall face of the linear groove 32c. Moreover, two overhanging portions 33d, 33e are formed at the right front end of the moving lever 33, the overhanging portions being extended downward and separated from each other in the longitudinal direction (along the Y axis) and the overhanging portions 33d, 33e are slidably fitted in the two linear openings 32d, 32e extended in the longitudinal direction of the right end of the support 32. A boss 33f is formed on the right side face of the overhanging portion 33d and smoothly abuts on the right wall face in the linear opening 32d.

As shown in FIGS. 16(a) and (b), an overhanging portion 33g extended downward is formed at the rear end of the moving lever 33 and the rear end of the magazine 5 can mate therewith, i.e., the rear end of the magazine 5 mates with the overhanging portion 33g so as to make the moving lever 33 move back. Moreover, a coil spring 33h is coupled to the moving plate 33 to supply the moving plate with a bias force in the forward direction (in the directo of arrow Y).

As shown in FIGS. 14, 16(a) and (b), a pair of detecting switches 34, 35 for causing the overhanging portions 33d, 33e of the moving lever longitudinally movable to mate with the actuators 34a, 35a thereof and actuate the actuators are arranged down from the moving lever 33.

The moving lever 33 and the detecting switches 34, 35 constitute a means for detecting the magazine 5 loaded onto the magazine loader in the housing 2.

As shown in FIG. 17, burrs 33i produced when the linear openings are punched remain in the edges of the pair of linear openings 33a. However, the burrs are prevented from contacting the support 32 as the moving lever 33 is attached to the support 32 in the above-described manner.

Subsequently, a description will be given of the moving means of the moving member 18 composed of the moving chassis 19, 20 for moving the member 18 in the vertical direction (along the Z axis).

Figure 7:
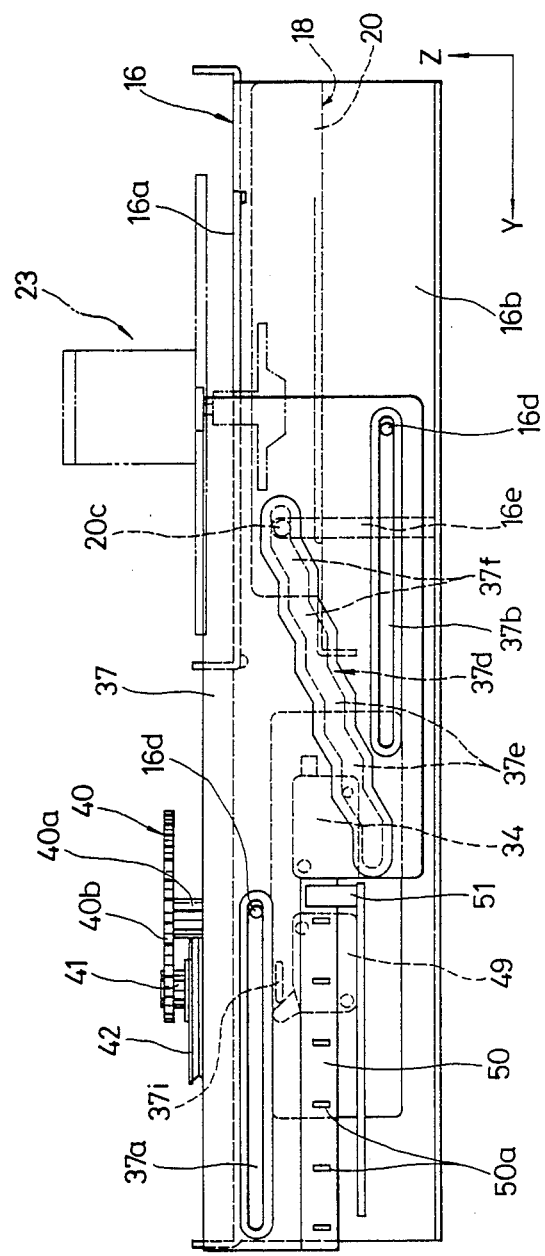
FIGS. 7 through 9 are views taken on lines VII—VII, VIII—VIII and IX—IX of FIG. 6, respectively.
Figure 8:
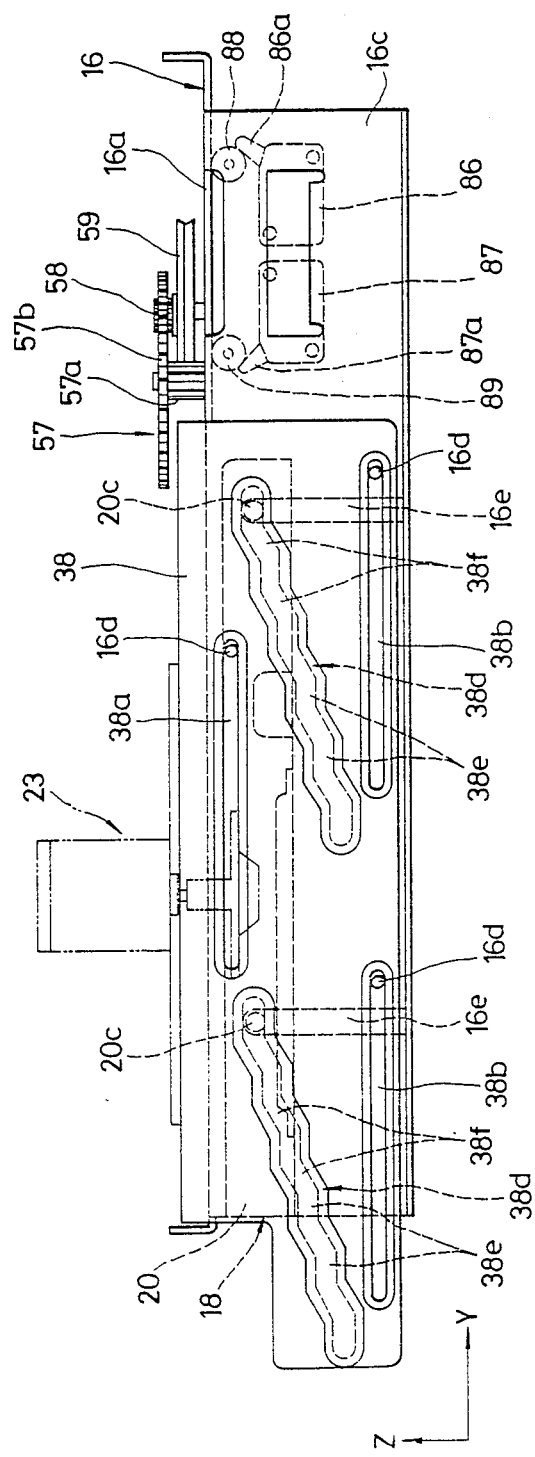

As shown in FIGS. 6 through 10, longitudinal moving plates 37, 38 as a pair of moving members extending in the longitudinal direction are installed on the outer faces of the left- and right-hand elevated portions 16b, 16c of the chassis 16. As shown in FIGS. 7 and 8, the moving plates 37, 38 are respectively equipped with guide grooves 37a, 37b and 38a, 38b extending in the directions where the moving plates extend and the moving plates 37, 38 are attached to the chassis 16 as the guide grooves movably mate with the pins 16d protruded from the outer faces of the elevated portions 16b, 16c. In other words, the moving plates 37, 38 are allowed to reciprocate in the longitudinal direction.

The moving member 18 composed of the moving chassis 19, 20 is referred to as a first moving member, whereas the moving plates 37, 38 are referred to as a second moving member. As shown in FIGS. 7 and 8, the guide grooves 37b, 38b out of those 37a, 37b, 38a, 38b formed in the moving plates 37, 38 as the second moving member are deflected to one side relative to the direction where each moving plate moves, i.e., downward in this case. The other guide grooves 37a, 38a are not so deflected.

The moving chassis forming the moving member 18 as the first moving member is equipped with three pins 20c, namely one on the left-hand side and two on the right-hand side. As shown in FIGS. 7 and 8, each pin is movably fitted in the guide groove 16e extended in the longitudinal direction of both left and right elevated portions 16b, 16c of the chassis 16 as a support member, so that the moving chassis 20 is guided in the vertical direction.

The guide groove 16e formed in the chassis 16 is referred to as a first guide groove, whereas the guide grooves 37b, 38b formed in the moving plates 37, 38 as the second moving members are referred to as a second guide groove.

The pin 20c protruded from both sides of the moving chassis 20 in the lateral direction is outwardly protruded from the chassis through the guide groove 16e of the chassis 16 and cam grooves 37d, 38d formed in the insides of the moving plate 37, 38 as the second moving member are caused to movably mate with the pin 20c. The cam groove 37d formed in the moving plate 37 is totally tilted downward (opposite to the direction of arrow Z) toward the front (in the direction of arrow Y). Moreover, the cam groove 38d formed in the moving plate 38 is totally tilted upward toward the front. In other words, the cam grooves 37d, 38d are formed so that, when the moving plates 37, 38 as the second moving member relatively move, the moving member 18 (composed of the moving chassis 19, 20) as the first moving member may be moved vertically.

The cam grooves 37d, 38d are formed between guide grooves 37b, 38b formed in one side (lower side) relative to the direction where the moving plates 37, 38 move and the other side (upper side) of the moving plate. Moreover, the cam grooves 37d, 38d are respectively formed of six linear portions 37e, 38e extended in the direction where the moving plates 37, 38 are moved (in the longitudinal direction) and portions 37f, 38f contiguous to the linear portions and tilted relative thereto, the cam grooves 37d, 38d being step cam grooves as a whole. As shown in FIGS. 7 and 8, the end of a guide groove (a second guide groove) 16e formed in the chassis 16 is made to conform to the ends of the cam grooves 37d, 38d.

As is obvious from the above-described construction, the moving member (forming the moving chassis 20) is supported in three places of the chassis 16 as a support member through the pin 20c and the moving plates 37, 38. However, as shown in FIG. 10, one of the support points (i.e., the position of the pin 20c) is arranged close to the connection between the tray guide groove 30a of the tray guide member 30 and the tray guide of the moving member 18 (consisting of the arcuate guide face 19 of the moving chassis 19 and that 20a of the moving chassis 20).

As one of the support points for supporting the moving member 18 is thus arranged, the tray guide of the moving member 18 can be accurately positioned in the tray guide groove 30a and accordingly, the disk can be carried smoothly and accurately.

As shown in FIGS. 6 and 9, a rack 37h is formed at the right front end of the left moving plate 37 along the direction where the moving plate is extended. A small toothed wheel 40a of a double toothed wheel 40 mounted on the horizontal place of the chassis 16 engages with the rack 37h, whereas a large toothed wheel 40b thereof is coupled to the output shaft of a motor 45 through a pulley 42 formed together with the toothed wheel 41, a belt 43 and a small pulley 44. A swivel lever 47 is rotatably installed in the approximate center of the horizontal place 16a of the chassis 16 between the left and right moving plates 37, 38 through a swivel shaft 47a extended along the Z axis and both ends of the swivel lever 47 are pivotally attached to the moving plates 37, 38.

The double toothed wheel 40, the toothed wheel 41, the pulley 42, the belt 43, the small pulley 44, the motor 45, the swivel lever 47 and relative small peripheral members constitute a means for giving driving force to the moving plates 37, 38 as the second moving member. Moreover, the means for providing the driving force and the moving plates 37, 38 as the second moving members constitute a means for moving the moving member 18 consisting of the moving chassis 19, 20 along the Z axis.

As shown in FIG. 7, a detecting switch 49 is attached to the inner face of the elevated portion 16b on the left-hand side of the chassis 16 and used to detect the moving plate 37 as the reciprocating second moving member in the longitudinal direction when it is located in the return position (the front marginal position). The detecting switch 49 is operated as the mating boss 37i protruded from the left face of the moving plate 37 mates with the actuator. An address plate 50 having six slits 50a arranged along the direction where the moving plate moves is installed on the front right face of the moving plate 37. A photosensor 51 for detecting the slit corresponding to the slit 50 of the address plate is installed in the rear of the detecting switch 49. The detecting switch 49 is referred to as a first sensor, whereas the photosensor 51 is referred to as a second sensor. The slit detection signal obtained from the second sensor is sent to a counter (not shown) for counting the slit detection signal. A control means (not shown) for automatically controlling the multidisk player is arranged in a fixed position in the housing and used to detect the stop position of the moving plate according to the value counted by the counter.

The detecting switch 49 as the first sensor, the address plate 50, the photosensor 51 as the second sensor, the counter and the control means constitute a positioning mechanism for moving the moving plate 37 to a desired address position and positioning the plate therein. The positioning mechanism operates so as to move the moving plate 27 to the extent corresponding to the difference between the present address and what is desired, provided that the photosensor 51 as the second sensor produces the slit detection signal. When the photosensor 51 produces no slit detection signal, the positioning mechanism operates so as to move (back) the moving plate 37 until the detection signal is obtained from the detecting switch 49 as the first sensor and then move the moving plate to a desired position.

Figure 18:
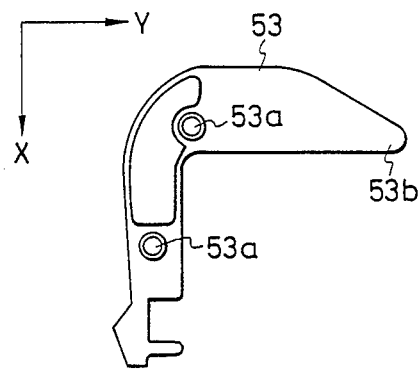

As shown in FIGS. 6 and 10, a tray protruding member 53 for protruding each tray from the magazine body 8 by mating with each of the trays 11, 12 in the magazine 5 is installed in the upper right front end of the moving chassis 20 forming the moving member. FIG. 18 shows the tray protruding member 53 in detail. As shown in FIG. 18, the tray protruding member 53 is L-shaped as a whole and guided as a pair of pins 53a protruded from the tray protruding member movably mate with two arcuate guide grooves 20e, 20f (e.g., see FIG. 12) formed in the moving chassis 20 and having different radii of curvature. In other words, the tray protruding member 53 rotates with the center of the curvature of each arcuate guide groove 20e, 20f as a rotating axis and causes the trays 11, 12 to be protruded from the magazine body 8 at the end 53b of rotation by pushing them. As shown in FIGS. 2(b) and 6, the assumed rotary axis of the tray protruding member 53 (the center of the curvature of each of the guide grooves 20e, 20f) is made to conform to the position of the rotary support shaft 8a of each of the trays 11, 12. Moreover, each of the trays 11, 12 is projected from the magazine body 8 when their portions 11d, 12d (see FIGS. 2(b), 4 and 5) located close to the rotary support axis 8a are pushed.

The tray protruding member 53 is composed of relatively soft resin with the rotary end 53b thereof made flexible in the vertical direction, i.e., in the direction where the trays 11, 12 are arranged and supplied with a small quantity of play in the vertical direction. In consequence, the flexible rotary end is allowed to move in conformity with the tray guide passage when part of the rotary end 53b is inserted in the (above-described) tray guide passage of the magazine body 8. The tray protruding member 53 mates with the Y-shaped groove 20g (see FIG. 10) of the chassis 20 and its movement in the (vertical) direction of arrow Z is controlled when its rotary end 53b is not actuated.

The tray protruding member 53 is installed on the moving chassis 20 forming the moving member 18 and therefore the above-described means for moving the member (consisting of the moving plates 37, 38, etc.) and the mechanism including the address plate 50 constitute a means for moving the tray protruding member so as to move the tray protruding member 53 together with the moving member 18 to the position where it mates with the tray (11 or 12) loaded with the disk 10 being replayed.

Subsequently, a means for driving the tray protruding member 53 drives the tray protruding member 53 designed to protrude each of the trays 11, 12 from the magazine body 8.

Figure 19A:
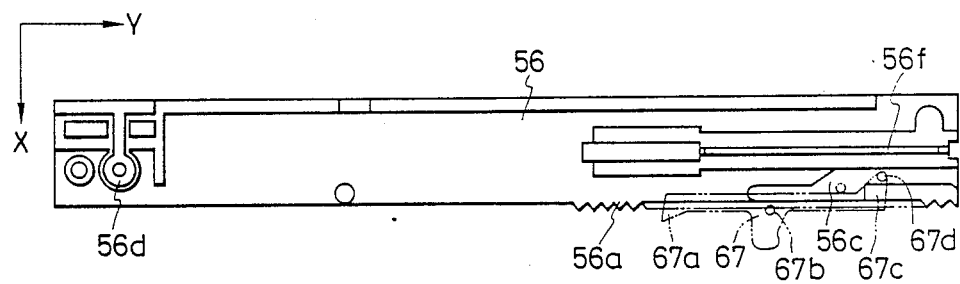

As shown in FIGS. 6, 9 and 10, a moving body 56 extending in the longitudinal direction is arranged on the right-hand side of the chassis 16 and the moving body is movably attached to the chassis 16 in the extending direction. FIGS. 19(a) and (b) show the moving body 56 in detail. The moving body 56 is equipped with a rack 56a along the direction where the moving body is extended. The rack 56a engages with the small toothed wheel 57a of the double toothed wheel 57 installed on the horizontal plane 16a of the chassis 16. The large toothed wheel 57b of the double toothed wheel 57 is coupled to the output shaft of a motor 62 through a pulley 59 in combination with a toothed wheel 58, a belt 60 and a small pulley 61. The double toothed wheel 57, the toothed wheel 58, the pulley 59, the belt 60, the small pulley 61, the motor 62 and the relevant small peripheral members constitute a means for providing the moving body 56 with driving force.

As shown in FIGS. 10 and 13, an oscillating lever 64 is arranged close to the deepest portion of the magazine loader in the housing so that the magazine 5 loaded on the magazine loader may be protruded from the magazine loader, the oscillating lever 64 being extended in the lateral direction. Moreover, the oscillating lever is made to freely oscillate beneath the guide-hold member 29 at roughly its center through a pin 64a. However, the pin 64a is extended in the vertical direction (along the Z axis). As shown in FIG. 13, the oscillating lever 64 is provided with an overhanging portion 64b extending to the right end thereof. The overhanging portion abuts the rear end of the magazine 5. The left end of the oscillating lever 64 is equipped with a gear 64c with the pin 64a at its center of curvature, and a control toothed wheel 65a attached to a damper 65 engages with the gear 64c. The damper 65 is intended to provide control force with the viscosity resistance of a viscous agent such as grease contained therein. The oscillating lever 64 is driven by the coil spring 64d so as cause the magazine to protrude.

The oscillating lever 64, the damper 65, and the coil spring 64d constitute a means for outwardly protruding the magazine 5 from the magazine loader in the housing 2. As shown in FIG. 13, the coil spring 64d is stretched in such a manner that an angle $\theta$ is kept acute, irrespective of the angular position of the oscillating lever, given that the angle formed with a straight line 66a connecting the center (the pin 64a) of the oscillation of the oscillating lever 64 and a point (the overhanging portion 64b) at which the oscillating lever and the magazine 5 mate with each other is defined as $\theta$. The coil spring 64d thus arranged is kept constant, irrespective of the magazine protruding force applied to the oscillating lever 64.

As shown in FIGS. 6 and 10, a lock member 67 for locking the magazine in the loading position in the housing 2 by making the swivel end 67a of the chassis 16 close to its right end mate with the recess 5a (see FIG. 2(b)) is rotatably installed close to the right end of the chassis 16 with the pin 67b as its center. The lock member 67 is so energized by a spring member 68 (see FIG. 6) as to make the lock member 67 swivel, one end 67a being inserted in the mating recess 5a of the magazine 5. As shown in FIG. 19(a), the pin 67d protruded from the swivel other end 67c of the lock member 67 slidably mates with the cam groove 56c formed in the front end of the moving body 56. In other words, the lock condition effected by the lock member 67 is released by the lock mechanism consisting of the lock member 67 and the spring member 68.

Figure 20:
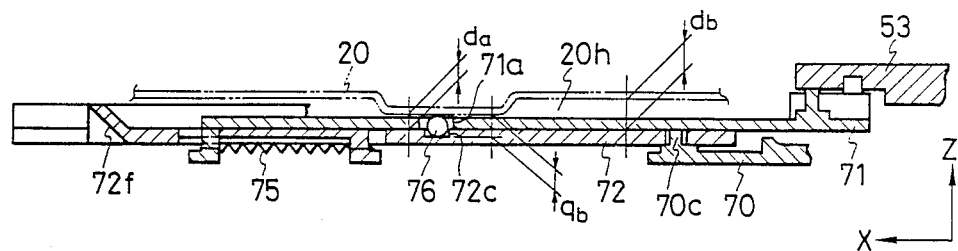
Figure 21:
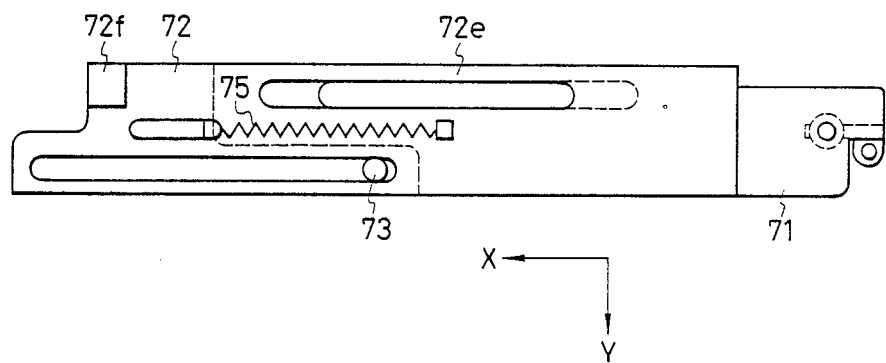
Figure 22A:
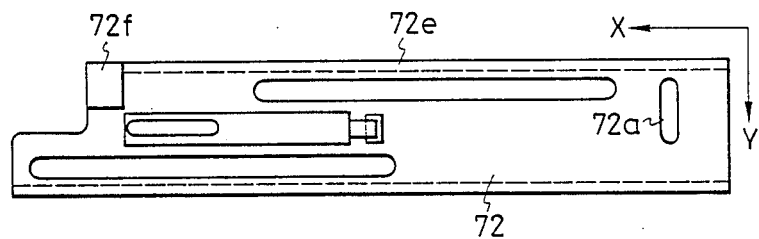
Figure 22B:
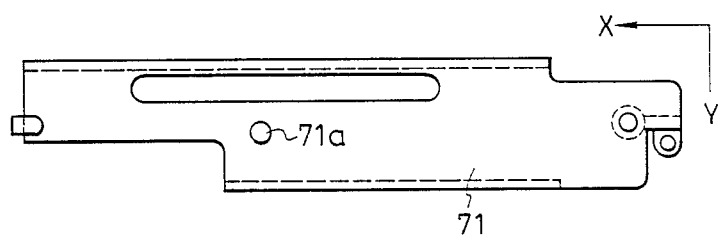

As shown in FIGS. 6, 9 and 10, an intermediate lever 70 is rotatably attached, through a pin 70a, to the under surface of the moving member 18 (forming the moving chassis 20) moving in the vertical direction (along the Z axis). One end of the intermediate lever 70 is equipped with a U-shaped cut 70b capable of smoothly mating with the columnar mating portion formed at the vertically extended rear end of the moving body 56. As shown in FIGS. 20, 21, a first lever member 71 and a second lever member 72 extending in the lateral direction are arranged at the under surface front end of the moving chassis 20 and are reciprocatingly attached in the extended direction thereof through a plurality of pins 73. FIGS. 22(a) and (b) show the first and second lever members 71, 72 in detail. As shown in FIG. 10, the pin 70c is projected from the other end of the intermediate lever 70 and slidably fitted in long hole 72a extended in the longitudinal direction on the right-hand side of the second lever member 72. In other words, the intermediate lever 70 swivels with the pin 70a as its center when the moving body 56 reciprocates (along the Y axis) and the second lever member 72 reciprocates laterally (along the X axis). The means for driving the moving body 56 including the moving body 56 and the motor 62, the intermediate lever 70 and the relevant peripheral members constitute a driving mechanism for driving the second lever member 72. The first lever member 71 mates with the tray protruding member 53 at its right end and causes the tray protruding member to rotate by means of its reciprocating movement (to the right). The second lever member 72 is used to move a support (described later) forming a clamp mechanism, which will also be described later.

As shown in FIGS. 10, 20 and 21, one end of a coil spring 75 is coupled to the first lever member 71, the coil spring being used to energize the first lever member in its reciprocating direction, i.e., the right-hand direction (opposite the direction shown by arrow X). The coil spring 75 is incorporated in such a manner that it is sandwiched between the first and second lever members, with the other end of the coil spring being coupled to the second lever member 72.

As shown in FIG. 20, a first laterally extending recess 20h is formed under the surface of the moving chassis 20 and a second recess 72c facing the first recess 20h is formed in the surface of the second lever member 72. The first lever member 71 sandwiched between the moving chassis 20 and the second lever 72 is provided with a hole 71a facing the first and second recesses 20h, 72c. In the hole 71c is arranged a moving spherical piece 76 capable of mating with the first recess 20h and the second recess 72c. The dimension shown by da in FIG. 20, i.e., the distance between the moving chassis 20 and the second lever member 72 within a relatively movable range is set smaller than the outer diameter of the movable piece 76. Moreover, the dimension indicated by db in FIG. 20, i.e., the distance between either face of the moving chassis 20 or second lever 72 facing each other and one of the bottom recessed surfaces facing one of the first and second recessed portions 20h, 72c is made slightly greater than the outer diameter of the movable piece.

The above first and second recesses 20h, 72c, the opening 71a, and the movable piece 76 are used to lock the first and second lever members 71, 72, with the locked state wherein the first and second lever members being reciprocated (in the right direction=opposite to what is shown by arrow X), and when the first lever member 71 is brought to close to the reciprocating position again (i.e., the position wherein tray protruding member 53 driven by the first lever member 71 completely drives the trays 11, 12 out of the magazine body 8), the locked position is released. The slight movement of the first lever member 71 released from the second lever member 72 to the above reciprocating position is made by the coil spring 75 and, during the slight movement of the first lever, the arcuate portions 11e, 12e of the tray 11, 12 (see FIGS. 4, 5) abut the arcuate portions 19c (see FIGS. 6, 10) formed on the moving chassis 19, causing the disk 10 loaded on the tray to be positioned right under the disk loading face.

The lock-releasing means (with the moving piece 76, etc.), first and second lever members 71, 72, the coil spring 75 as an energizing means and the driving mechanism including the moving body 56 and the motor 62 for driving the second lever 72 constitute a means for driving the tray protruding member 53 (see FIG. 18) for protruding the trays 11, 12 from the magazine body 8.

On the other hand, the means for driving the tray protruding member, the chassis 16 as the support member, the moving member 18 as the first moving member (consisting of the moving chassis 19, 20), the tray protruding member 53 and the means for protruding trays with the moving plates 37, 38 constitute a means for protruding the tray 11 or 12 loaded with the disk 10 being replayed from the magazine body 8.

As shown in FIG. 10, a plate-shaped support 79 is extended laterally (along the X axis) on the left under surface of the moving member 18 (of the moving chassis 20) and oscillatably attached to the left end of the movable chassis 20 through the pin 79a. The pin 79a is extended in the longitudinal direction (along the Y axis) and accordingly the oscillating direction of the support body 79 is included in the place perpendicular to the disk loading face 23a (see FIG. 11(b)) of the turntable 23. A disk presser member 80 for abutting the opposite face of the turntable 23 of the disk and implementing the disk clamping in cooperation with the turn table is rotatably attached to the free end of the support body 79. A coil spring (not shown) for energizing the support body 79 in the direction where the presser member 80 is brought close to the disk loading face 23a of the turntable 23 is provided.

The support body 79 and the presser member 80 constitute a clamp mechanism for clamping the disk.

As shown in FIG. 10, the forwardly extending pin 79c is protruded from the free end of the support body 79 and allowed to mate with the flat guide 72e at the upper rear edge of the second lever member 72. At the left end of the second lever member 72 and also on the extension of the flat guide 72e is provided a tapered portion 72f capable of mating with the pin 79c of the support body 79. As shown in FIG. 20, the tapered portion 72f is tilted upward (in the direction of arrow Z) toward the left-hand side (in the direction of arrow X). In other words, the pin 79c of the support body 79 slides in the horizontal guide 72e as the second lever member 72 reciprocates (moves in the right direction=opposite to arrow X) and the presser member 80 is held in the clamp release position, whereby the presser member 80 is moved to the clamp position as the pin 79c moves down along the tapered portion 72f.

The turntable 23 and the presser member 80 now will be described.

Figure 23:
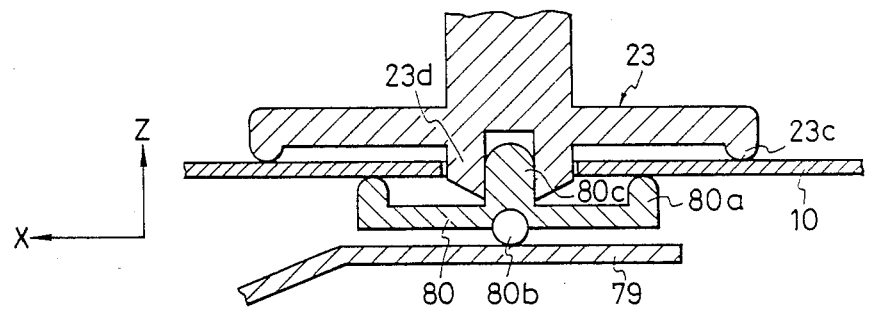

As shown in FIG. 23, an annular boss 23c is formed on the whole periphery of the disklike turntable and the turntable is used to support the disk 10 with the annular boss. On the other hand, an annular boss 80a abutting on the principal surface of the disk 10 also is formed on the periphery of the disklike presser member 80 acting as a clamp on the disk in cooperation of the turntable 23 as the principal member of the clamp mechanism. The diameter of the annular boss 80a of the presser member 80 is set smaller than that of the annular boss 23c of the turntable. As mentioned above, the presser member 80 is rotatably supported by the support body 79 through a spherical bearing member 80b so as to be movable relative to the turntable 23. A cylindrical guide 23d for positioning the disk to the center hole of the disk 10 against the turntable is protruded from the center of rotation of the turntable 23. Moreover, a boss 80c mating with the guide 23d and used to center the presser member 80 relative to the turntable 23 is formed in the center of rotation of the presser member 80.

The clamp mechanism, the second lever member 72 and the (above-described) driving mechanism for driving the second lever member constitute a means for moving the disk upward (in the direction of arrow Z) or moving the disk loaded on the tray 11 or 12 protruded from the magazine body 8 by the tray protruding means in the direction perpendicular to the disk loading face 23a of the turntable 23 (see FIG. 11(b)). The disk moving means and the tray protruding means constitute a disk carrier means for carrying any disk 10 selected in the magazine 5 to the disk loading face 23a of the turntable 23. The second lever member 72 and the driving mechanism for driving the second lever member are commonly used for the tray protruding and disk moving means.

As shown in FIGS. 6, 9 and 10, a plate-shaped presser member 83 is arranged between the moving chassis 19 forming the moving member 18 and the moving chassis 20 and the plurality of pins 83a protruded from the disk presser member are attached to the moving chassis 19 in such a manner that they are allowed to freely mate with the cam groove 19e. As also shown in FIG. 11(b), the cam groove 19e is, for instance, tilted upward (in the direction of arrow Z) toward the left (in the direction of arrow X). In other words, the cam groove 19e is so formed as to move the disk presser member 83 vertically when the disk presser member 83 is moved laterally.

As shown in FIGS. 9 and 10, the boss 83b extending downward is formed on the under surface of the disk presser member 83 at its right rear end and, as one end 70e (see FIG. 10) of an intermediate lever 70 presses the right edge of the boss 83b, the disk presser member is moved to the left (in the direction of arrow X). The disk presser member 83 is supplied by the coil spring 84 with bias force to the right (opposite to the the direction of arrow X). The under surface of the disk presser member 83 abuts the opposing face of the disk loading face as the disk is moved by the disk moving means in the direction perpendicular (in the vertical direction) to the disk loading face 23a of the turntable 23 (see FIG. 11(b)), whereby the disk 10 is kept in parallel with the disk loading face.

As shown in FIGS. 6 and 8, a pair of detecting switches 86, 87 longitudinally arranged are attached to the inner face (left face) of the elevated portion 16c on the right-hand side which is part of the chassis 16. Both detecting switches 86, 87 are used to detect the position of the moving body 56 driven by the motor 62. As shown in FIG. 8 in particular, each of the detecting switches 86, 87 is equipped with an actuator 86a, 87a inclined against and protruded from the switch body. A pair of rollers 88, 89 movable only in the vertical direction (along the Z axis) relative to the support body 32 (see FIG. 15) fixed to the chassis 16 are made to mate with the free ends of the actuators 86a, 87a. As shown in FIGS. 19(a) and (b), each of the rollers 88, 89 mates with the boss 56f which is trapezoidal in cross section and which extends in the longitudinal direction on the front end under surface of the moving body 56. In other words, the action of the boss 56f causes each of the rollers 88, 89 to move properly in the vertical direction when the moving body 56 is moved by a fixed space in the longitudinal direction, whereby each of the detecting switches 86, 87 is operated. However, the movement of the rollers 88, 89 upward is caused by the bias force applied to each of the actuators 86a, 87a by the means for providing the bias force such as springs installed in the switches 86, 87.

The signals produced by the detecting switches 34, 35, 49, 86, 87 and the photosensor 51 are transmitted to the above-described controller (not shown) and, according to the signal produced by the controller in response to the above signals, the motors 27, 45, 62 and the turntable 23 are operated at a fixed timing.

Figure 24:
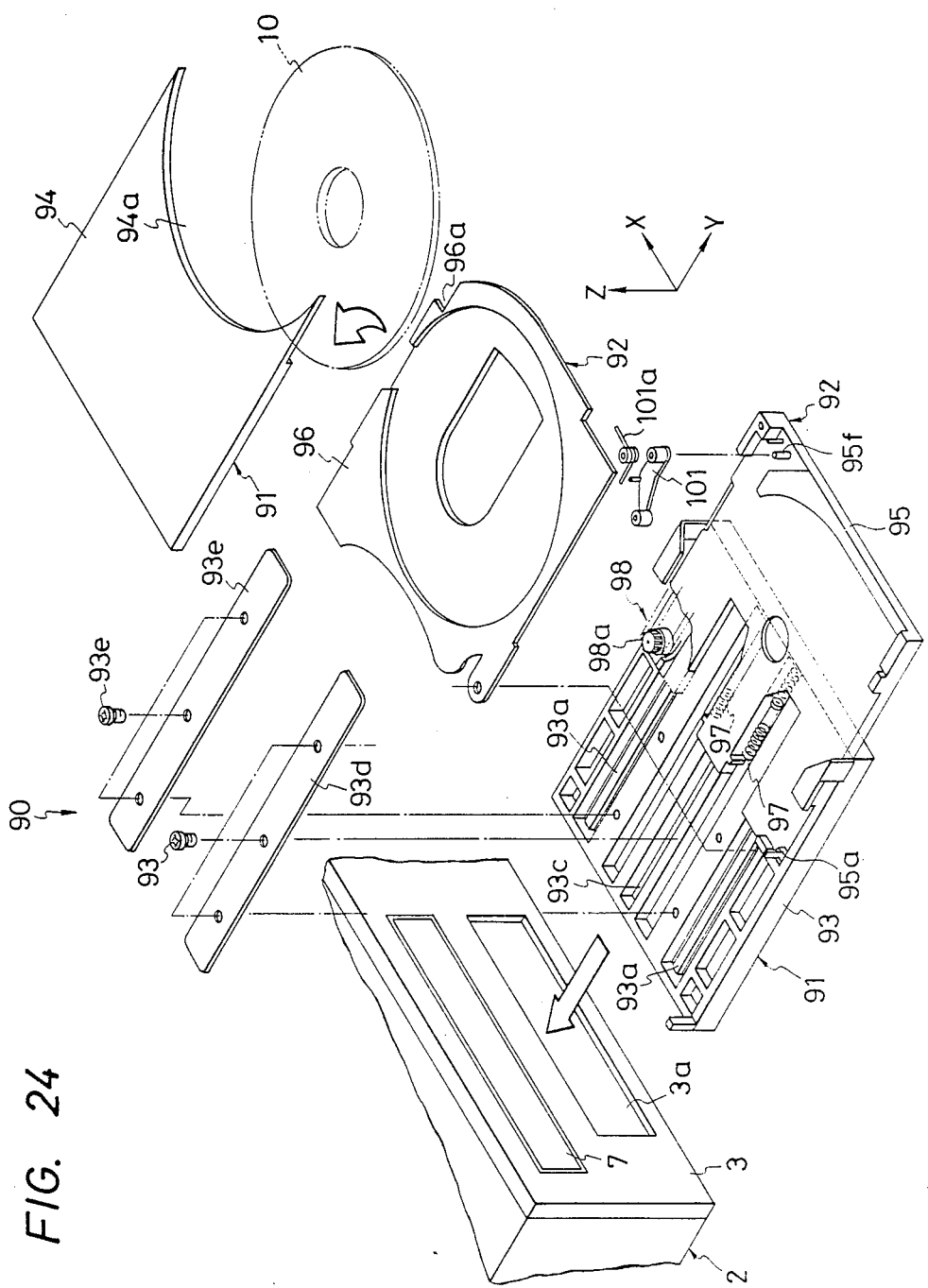
FIGS. 24 through 26 are views descriptive of the single adapter.

FIG. 24 shows a single adapter 90 detachably attached to the magazine loader of the multidisk player 1, the single adapter being loaded with one replaceable disk. As shown in FIG. 24, the single adapter comprises a first member 91 directly installed in the magazine loader and a second member 92 slidable within a fixed range along the direction where the first member is fitted in the magazine loader and loaded with the disk. The first member 91 is composed of a rectangular bottom plate 93 and a ceiling plate 94 provided with a semicircular recess 94a at its front end. The second member 92 is composed of a slide plate 95 slidably attached to the (bottom plate 93 of the) first member 91 and a tray 96 for rotatably supporting the disk 10 on a pin 95a protruded from the right rear end of the slide plate.

Figure 25:
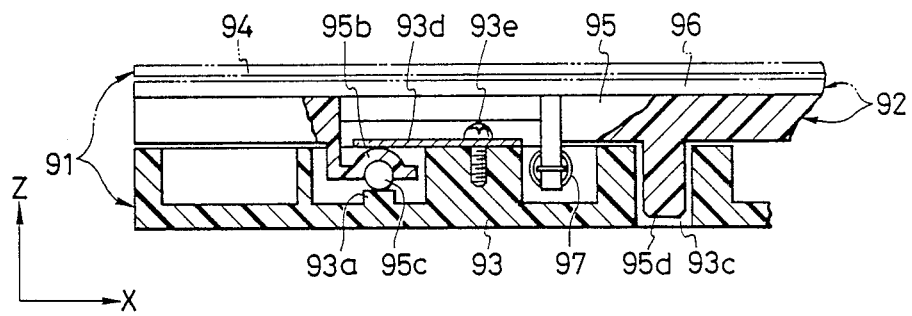

As shown in FIG. 25, a pair of rails extending in the longitudinal direction (along the Y axis) are formed on the bottom plate 93 forming the first member 91, whereas a plurality of steel balls 95c attached to an overhanging portion 95b formed on the slide plate 95 forming the second member 92 smoothly abut on the rails. A linear opening 93c extending in the longitudinal direction is formed in the center of the bottom plate 93 and a boss 95d protruded from the under surface of the slide plate 95 is used to guide the slide plate as it slides in the opening. A leaf spring 93d made of a steel plate is arranged in a position where the overhanging portion 95b and the steel balls 95c together with the rails are sandwiched therebetween and fixed to the body of the bottom plate 93 with screws 93e. The leaf spring 93d forms part of the bottom plate 93. The bottom plate 93 excluding the leaf spring 93d is formed of resin, i.e., one side of the first and second members 91, 92 mutually sliding is prepared from resin, whereas the other sides is made of metal.

A coil spring 97 is suspended between the front and rear ends of the bottom plate 93 and the slide plate 95. The coil spring 97 is designed to provide the second member including the slide plate 95 with moving force. As shown in FIG. 24, moreover, a damper 98 having a control toothed wheel 98a is installed at the left end of the bottom plate 93 and a rack (not shown) extended in the longitudinal direction of the slide plate 95 engages with the control toothed wheel 98a. The damper 98 is used to give control force by making use of the viscosity resistance of a viscosity agent such as grease.

Figure 26:
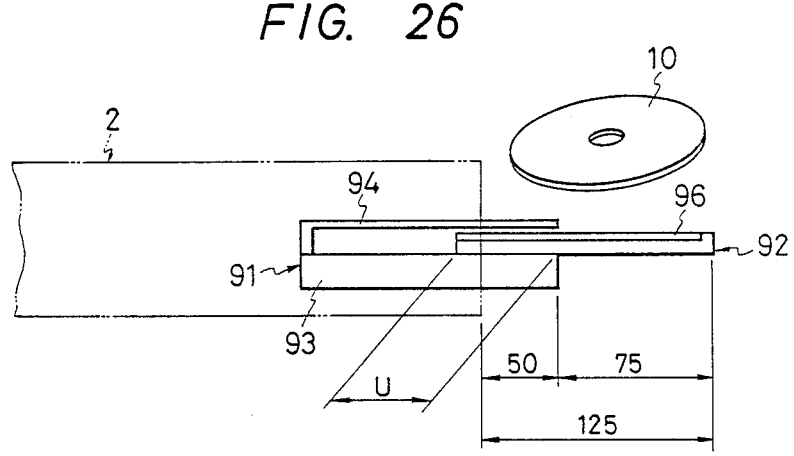

As shown in FIG. 24, a presser lever 101 extended in the roughly longitudinal direction (along the Y axis) is installed at the left front end of the slide plate 95 and oscillatingly attached to the slide plate 95 through the pin 95f at its front end. However, the pin 95f is extended in the vertical direction (along the Z axis). The rear end of the presser lever 101 is allowed to smoothly mate with a cut 96a formed at the free end of the tray 96. A spring member 101a for pressing the tray against the presser lever is made to mate with the presser lever 101. The presser lever 101 and the spring member 101a constitute a holding mechanism for holding the tray 96 in the fixed position of the slide plate As shown in FIG. 26, when the second member is moved relative to the first member 91 in order to mount the disk 10 (on the tray 96 forming the second member 92), the first member 91 is also protruded from the magazine loader in the housing 2. However, the movement of the second member 92 relative to the first member 91 is implemented by the coil spring 97 and the protrusion of the first member 91 from the magazine loader is carried out by, e.g., the oscillating lever 64 and the coil spring 64d shown in FIG. 10. The first and second members 91, 92 to be locked in the magazine loader are locked by the lock member 67 shown in FIG. 19(a).

It has been so arranged as shown in FIG. 26 that the sum of the quantity (e.g., 50 mm) of protrusion of the first member 91 from the magazine loader and that (e.g., 75 mm) of the movement of the second member 92 relative to the first member 91 is slightly greater than the diameter (120 mm) of the disk 10. As a result, the dimension shown by U in FIG. 26, i.e., the dimension at which the first and second member 91, 92 are superposed when the second member is protruded from the magazine loader so as to load the second member 92 (of the tray 96) with the disk 10 is made relatively large.

The position wherein the single adapter 90 is loaded with the disk 10 corresponds to the approximate position of the central disk among the six of them contained in the magazine 5 (see FIGS. 1 through 5). In consequence, the disk loaded on the single adapter 90 is made stable in position, whereas the external appearance when the first and second members 91, 92 are protruded therefrom is kept fine.

Figure 16B:
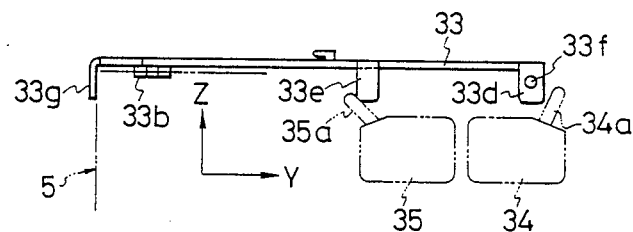

When the single adapter 90 is loaded in the player body, it is detected by the detecting switches 34, 35 shown in FIG. 16, i.e., each of the detecting switches for detecting the magazine 5 loaded in the player. More specifically, a recess is provided for the portion of the single adaptor 90 abutting on the overhanging portion 33g (on the rear end of which the magazine abuts) formed on the moving lever 33 for use in actuating the detecting switches 34, 35. The quantity of the movement of the lever 33 changes depending on the installation of the single adapter 90 or the magazine 5, thus causing the on-off state of each of the detecting switches 34, 35 to change and consequently it can be judged therefrom which one of the single adapter 90 and the magazine 5 is loaded.

The single adapter 90 (though not shown) is equipped with a lock mechanism for locking the second member 92 to the first member 91 when the single adapter has not been installed in the player body. The lock mechanism is released when the player body is loaded with the single adapter.

Figure 27:
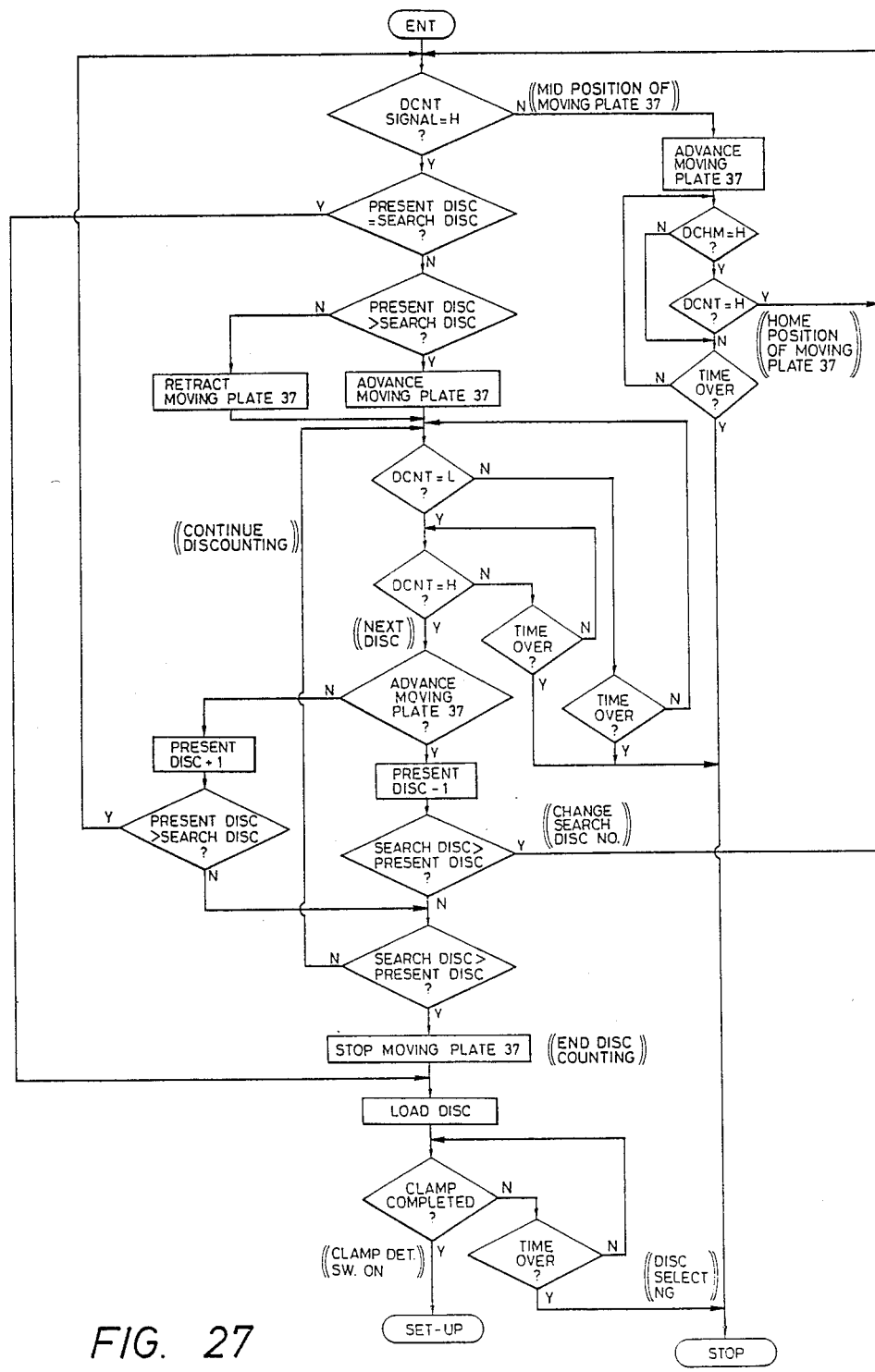
FIGS. 27 and 28 are views explanatory of the operation of the multidisk player.
Figure 28:
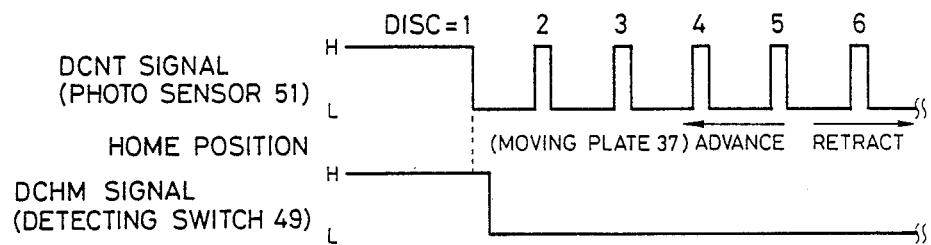

Referring to FIGS. 27 and 28, the operation of the multidisk player thus constructed will be described briefly in line with the playback procedure.

When a disk for being replayed is designated through the operation of the group of buttons 6 shown in FIG. 1, the motor 38 are moved back and forth (along the Y axis), Because of the stepped cam the direction opposite thereto). Because of the stepped cam grooves 37d, 38d formed in the moving plates 37, 38 and the guide groove 16e formed in the chassis 16, the pin 20c capable of being movably fitted in each groove is vertically moved and the moving member 18 including the moving chassis 20 from which the pin 20c is protruded is also vertically moved. Accordingly, the tray protruding member 53 provided on the moving member 18 is caused to reach the position where it can mate with the tray 11 or 12 loaded with the disk to be replayed.

The longitudinal movement and positioning of the moving plate 37 and therefore the vertical movement and positioning of the tray protruding member 53 will be described more specifically.

The DCNT signal shown in FIGS. 27 and 28 means a slit detecting signal derived from the photosensor 51, whereas the DCHM signal means a signal produced by the detecting switch 49 so produced as to check whether or not the moving plate 37 is located in the forward marginal position, i.e., the hose position. As shown in FIG. 27, the moving plate 37 is moved by an amount corresponding to the difference between the present address (present DISK) and a desired address (search DISK), provided that a transfer command exists while the DCNT signal is produced by the photosensor 51. If the transfer command exists while the DCNT signal is not produced by the photosensor 51, moreover, the moving plate 37 is moved forth until the DCHM signal is produced by the detecting switch 49 before being moved to the desired address position (search DISK).

When the tray protruding member 53 is thus located in the position where it mates with the tray loaded with the disk being replayed, the motor 62 starts revolving, causing the moving body 56 to be driven back (in the direction of arrow Y). In consequence, the intermediate lever 70 is swiveled counterclockwise in FIG. 10 and the second lever member 72 coupled to the intermediate lever is moved to the right (in the direction of arrow X). As shown in FIG. 20, the second lever member 72 is in the state wherein it is locked to the first lever member 71 by the lock-release means composed of the moving piece 76. The first lever member 71 is also moved to the right together with the second lever member 72 and thereby the tray protruding member 53 is swiveled, e.g., clockwise in FIG. 10. As shown in FIG. 2(b), the tray (e.g., the tray 12) loaded with a disk being replayed is protruded from the magazine body 8 and the disk is moved to the position concentric with the disk loading face 23a (see FIG. 11(b)) of the turntable 23, i.e., right beneath the disk loading face. However, the locked first and second lever members 71, 72 are released by the lock-release means immediately before the tray protruding member 53 is swiveled, i.e., the first lever member 71 is moved to the right. Then the first lever member 71 is energized by the coil spring 75 (see FIG. 20) and slightly moved to the right thereby. The arcuate portion 12e (see FIG. 2(b)) of the tray 12 thus pushed by the energizing force abuts the specified arcuate portion of the moving chassis 19, so that the tray is properly positioned. When the tray is completely driven out of the magazine body 8, the detecting switch 87 (see FIG. 8) interlocked with the movement of the moving body 56 produces a detection signal.

The second lever member 72 released from the first lever member 71 is further driven to the right (in the direction opposite to arrow X), causing the support 79 (see FIG. 10) of the clamp mechanism mating with the tapered portion 72f (see FIG. 20) of the second lever member by means of the pin 79c to oscillate upward (in the direction of arrow Z). Accordingly, the disk is lifted up and clamped on the turntable 23. The upward movement of the disk is represented as the DISK load in FIG. 27. As the disk moves up, the disk presser member 83 is also lifted together with the disk by the intermediate lever 70 which swivels. Notwithstanding, the disk presser member 83 is slightly placed apart from the disk at the point of time the disk is loaded on the turntable and the disk presser member is not allowed to interfere with the rotation of the disk.

Playback is thus started as the turntable 23 and the carriage 24 (see FIG. 9) operate.

When the playback is terminated, the disk is contained in the magazine body 8 again. As the procedure for containing the disk therein is a version in the reversed order thereof, no detailed description of the reverse procedure will be made. The same operation will be repeated depending on the designated number of pieces of music.

Figure 19B:
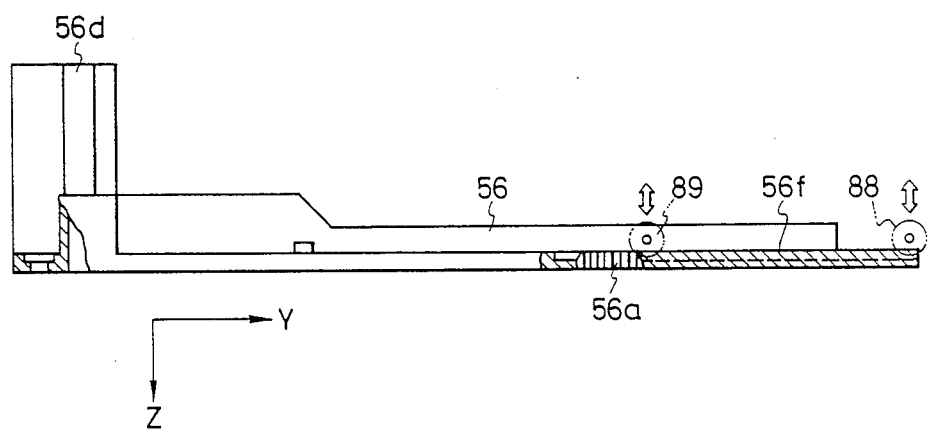

The magazine 5 is ejected from the player body by pressing one of the operating buttons 6. When the magazine eject button is pressed, the moving body 56 (see e.g., FIG. 19) is moved forth to a fixed extent (in the direction of arrow Y) and the magazine 5 locked by the lock member 67 is released. The oscillating lever 64 shown in FIG. 10 thereby is caused to oscillate on the pin 64a and the magazine 5 mating with the free end of the oscillating lever is driven out of the player body.

With respect to the method of using the single adapter 90, it is only necessary to replace the magazine 5 with the former. In other words, the single adapter 90 is inserted in the opening 3a. The lock mechanism (not shown) for locking the second mechanism 92 to the first mechanism 91 is released then. The single adapter 90 is further forced in against the force of the coil spring 97, whereby the lock member 67 is caused to mate with recesses (not shown) provided in the first and second members 91, 92.

When playback is instructed then, the tray 96 is swiveled for playback as in the case of the magazine 5. If the listener wishes to replace the disk, he is supposed to push the magazine eject button, which causes the tray 96 to swivel in the opposite direction as in the case of the magazine 5 and releases the lock member 67. As shown in FIG. 26, the first and second members 91, 92 are protruded to the extent that the tray 96 is completely exposed outside the body. The listener who wishes to replace the disk need not remove the single adapter 90 again because it can be replaced with a new one only by pushing the second member loaded with the new disk together with the first member. If the first and second members 91, 92 in their protruded state are further drawn, it is possible to remove the single adapter 90 and replace it with the magazine 5.

As set forth above, the multidisk player according to the present invention includes the means (comprising the oscillating lever 54 and the coil spring 64d) for protruding the magazine 5 and the single adapter from the prescribed loader installed in the player housing 2 for being loaded with the magazine 5 and the single adapter 90, the single adapter comprising the first member 91 directly fitted in the magazine loader, the second member 92 movable within a fixed range relative to the first member along the direction where the first member is fitted in the loader, and the means (the coil spring 97) for supplying moving force with the second member, characterized in that the first member is protruded from the loader when the second member is moved relative to the first member and that the sum of the quantity of the protrusion of the first member and that of the movement of the second member relative to the first member is set slightly greater than the outer diameter of the disk.

In consequence, the dimension (shown by U in FIG. 26) representative of the overlapped first and second members is made greater when the second member is protruded from the above loader for loading the disk on the second member. The overlapped portion is accordingly made strong and prevented from being damaged, e.g., in the form of deformation, even if unexpected force is applied to the second member protruded therefrom.

In the disk player according to the present invention, as set forth above, the player includes a playback means including the annular turntable 23 and a clamp mechanism for clamping the disk 10 loaded on the turntable, whereby the the turntable is loaded with the disk by means of the annular boss 23c formed on the outer periphery of the turntable. The annular boss is provided with the annular boss 80a abutting the principal surface of the disk and formed on its outer periphery and an annular presser member 80 acting as disk clamping in cooperation with the turntable, the diameter of the annular boss 80a formed on the presser member being set smaller than that of the annular boss 23c of the turntable. In other words, the center of the portion loaded by the annular boss of the turntable out of the principal face of the disk is clamped so that the presser member is used only for pressing purposes. Accordingly, the principal surface of the disk corresponding to part of the annular boss formed on the presser member is supplied with a label, so that the force applied to the center of the disk by the presser member is deflected only in the radial direction of the disk even if there is a gap between the other portion of the annular boss and the principal surface of the disk. Accordingly, the clamped condition is kept unaffected and playback is carried out stably without the oscillation of the disk.

Figure 29:
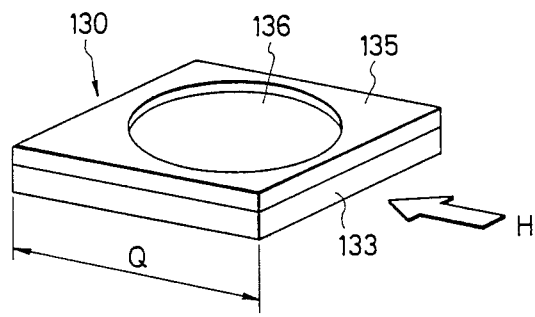
FIGS. 29 and 30 are views descriptive of the multidisk player already developed.
Figure 30:
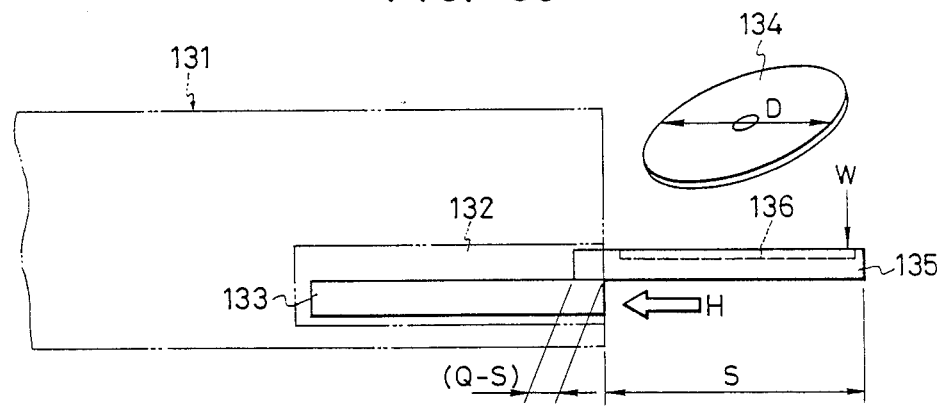

For the oscillation of the disk shown in FIG. 29, the annular boss of the presser member acts as a presser and the oscillation of the disk is thus effectively attenuated.

As set forth above, the multidisk player according to the present invention includes the means (comprising the oscillating lever 64 and the coil spring 64d) for protruding the magazine 5 and the single adapter from the prescribed loader installed in the player housing 2 for being loaded with the magazine 5 and the single adapter 90, the single adapter comprising the first member 91 directly fitted in the magazine loader, the second member 92 movable within a fixed range relative to the first member along the direction where the first member is fitted in the loader, and the means (the coil spring 97) for supplying moving force with the second member, characterized in that the first member is protruded from the loader when the second member is moved relative to the first member and that the sum of the quantity of the protrusion of the first member and that of the movement of the second member relative to the first member is set slightly greater than the outer diameter of the disk.

In consequence, the dimension (shown by U in FIG. 26) representative of the overlapped first and second members is made greater when the second member is protruded from the above loader for loading the disk on the second member. The overlapped portion is accordingly made strong and prevented from being damaged, e.g., in the form of deformation, even if unexpected force is applied to the second member protruded therefrom.

In the multidisk player according to the present invention, one side of the combination of the first and second members sliding on each other is made of resin, the other being made of metal. If the combination of those members sliding on each other is, e.g., composed of metal, the abrasion coefficient will be increased and this will cause a sliding noise. The multidisk player according to the present invention has the sliding portion composed of resin and metal to minimize the abrasion coefficient and prevent the production of the sliding noise, so that the movement of the second member relative to the first member is smoothly accomplished.

In the multidisk player according to the present invention, the magazine 5 comprises the magazine body 8 having a plurality of partitions 8b arranged roughly perpendicular to the disk loading face 23a of the turntable 23, a plurality of plate-shaped trays 11, 12 arranged in between said partitions, respectively loaded on the principal surfaces of the disks 10 and made rotatable between their protruding and receiving positions along the principal surfaces, and a holding means for holding said trays, said holding means comprising a first opening 8c concentrically formed in said partitions 8b, second openings 11a, 12a formed in the trays 11, 12 opposite to said first opening, a plurality of moving pieces 13a capable of moving along the parallel partitions inserted in the first and second openings, a means for respectively energizing the moving pieces and bringing them close to each other, and a presser means (e.g., the presser lever 14, etc.) for pressing the trays against the rotary support axle 8a and the position where there are received.

Each tray capable of being slightly shifted from the partition even when it is received in the magazine 8 is forced to move to the extent of the shift toward the rotary axle and the position where it is received. Accordingly, each tray is prevented from being subjected to backlash even when external force is applied to the whole magazine.

In the multidisk player according to the present invention, the magazine 5 comprises the magazine body 8 having a plurality of partitions 8b arranged roughly perpendicular to the disk loading face 23a of the turntable 23, a plurality of plate-shaped trays 11, 12 arranged in between said partitions, respectively loaded on the principal surfaces of the disks 10 and made rotatable between their protruding and receiving positions along the principal surfaces, and a holding means for holding said trays, said holding means comprising a first opening 8c concentrically formed in said partitions 8b, second openings 11a, 12a formed in the trays 11, 12 opposite to said first opening, a plurality of moving pieces 13a capable of moving along the parallel partitions inserted in the first and second openings, a means for respectively energizing the moving pieces and bringing them close to each other, and a presser means (e.g., the presser lever 14, etc.) for pressing the trays against the rotary support axle 8a and the position where they are received.

Each tray capable of being slightly shifted from the partition even when it is received in the magazine 8 is forced to move to the extent of the shift toward the rotary axle and the position where it is received. Accordingly, each tray is prevented from being subjected to backlash even when external force is applied to the whole magazine.

Moreover, the presser means in the multidisk player according to the present invention has one end oscillatingly attached to one end of the magazine body and the other end composed of the presser lever 14 smoothly mating with the free end of the each tray and the means (spring means 14b) for providing the presser lever with the force for pressing the tray, the presser lever is equipped with the boss 14c for abutting the portion provided in the loader when the magazine is totally separated from the loader from the player housing and oscillating the presser lever in such a manner as to energize the each tray to the try receiving position.

In case one or several trays cannot be contained completely for some reasons, the magazine in that state may be ejected from the magazine loader in the player housing. When the magazine is ejected from the magazine loader in the player housing in such a state, part of the tray projected from the magazine body is hooked by the edge (3b) of the opening of the magazine loader and the magazine is thus prevented from being ejected therefrom. In the multidisk player, as set forth above, the boss 14c for forcing the each tray to be contained in the magazine body as the magazine is ejected therefrom ensures that the magazine is ejectable.

In the multidisk player according to the present invention, as set forth above, the magazine loading detection means for detecting whether or not the magazine 5 for arranging and containing a plurality of disks 10 is installed in the prescribed magazine loader, a moving lever 33 moved when the magazine movable installed along the direction wherein the magazine is set close to the magazine loader to mate therewith, and a pair of detecting switches 34, 35 mating with the moving lever. In consequence, the single adapter 90 capable of containing one replaceable disk and equivalent to a magazine containing one disk can be used. In other words, when the magazine containing a plurality of disks is loaded in the loader, the moving lever 33 is caused to move over the whole moving stroke. Whereas the moving lever is allowed to move by half of the moving stroke when the single adapter 90 is installed. The pair of detecting switches are acutated so as to detect which one of the magazine and the single adapter is installed.

The use of the single adapter makes it possible to instantly load the player with a desired disk and readily replace the disk. Accordingly, the operability of the system can be improved significantly.

What is claimed is:

1. A multidisk player for playing disks, said player comprising:
   a housing;
   playback means for reproducing signals recorded on said disks;
   a magazine for holding a plurality of said disks arranged in order;
   a magazine loader within which said magazine is detachably fitted within said housing;
   a single adapter detachably fitted in said magazine loader for replaceably loading a single disk therein;
   disk carrier means for carrying a disk held in said magazine in said single adapter to a playback position; and
   means for driving said magazine and said single adapter outwardly out of said loader, said single adapter comprising:
   a first member fitted directly in said magazine loader;
   a second member on which said disk is loaded, said second member being movable within a fixed range relative to said first member and along a direction in which said first member is fitted in said magazine loader; and
   means for driving said second member, wherein said first member is driven out of said magazine loader when said second member is moved relative to said first member, and wherein the total amount of protrusion of said first member from said magazine loader and protrusion said second member relative to said first member away from said multidisk player is slightly greater than an outer diameter of said disk, the amount of said protrusion of said second member relative to said first member being less than an outer diameter of said disk.

2. A multidisk player as claimed in claim 1, wherein position where said disk is loaded on said single adapter roughly corresponds to a position where, among the plurality of disks loaded in said magazine, the center disk is placed.

3. A multidisk player for playing disks, said player comprising:
   a housing;
   playback means for reproducing signals recorded on said disks;

a magazine for holding a plurality of disks arranged in order;

a magazine loader within which said magazine is detachably fitted within said housing;

a single adapter detachably fitted in said loader, said single adapter being replaceably loaded with a disk;

disk carrier means for carrying said magazine and said disk in said single adapter to a playback position; and means for driving said magazine and said single adapter outwardly out of said magazine loader;

said single adapter comprising:
- a first member directly fitted in said magazine loader;
- a second member on which said disk is loaded, said second member being movable within a fixed range relative to said first member and along a direction in which said first member is fitted in said magazine loader; and
- means for driving said second member, wherein said first member is driven out of said magazine loader when said second member is moved relative to said first member, and wherein a total amount of protrusion of said first member from said magazine loader and movement of said second member relative to said first member away from said multidisk player is slightly greater than the outer diameter of said disk, the amount of said protrusion of said second member relative to said first member being less than an outer diameter of said disk, one side of the combination of said first and second members sliding on each other being composed of resin, the other being composed of metal.

4. A multidisk player for playing disks, said player comprising:

a housing;

playback means for reproducing signals recorded on said disks, said playback means having a disk loading face against which said disks are pressed for playing;

a magazine for holding a plurality of disks arranged in order;

a magazine loader within which said magazine is detachably fitted within said housing; and disk carrier means for selecting any one of the disks in said magazine and carrying said disk onto said disk loading face, said magazine comprising;
- a magazine body having a plurality of partitions arranged in order along a direction roughly perpendicular to said disk loading face, a plurality of plate-shaped trays respectively arranged between the partitions, each tray supporting a disk on its principal surface and rotating in between disk protruding and receiving positions along the principal surface thereof relative to said magazine body; and
- holding means for holding each tray in said disk receiving position, said holding means having a first opening formed in each partition, a second opening formed opposite to said first opening, a plurality of moving pieces disposed between said first and second openings and made movable along a direction in which said partitions are arranged, means for moving said moving pieces close to each other, and means for pressing each tray toward the position where the tray is received.

5. A multidisk player for playing disks, said player comprising:

a housing;

playback means for reproducing signals recorded on said disks, said playback means having a disk loading face against which said disks are pressed for playing;

a magazine for holding a plurality of disks arranged in order;

a magazine loader in which said magazine is detachably fitted within said housing; and disk carrier means for selecting any one of the disks in said magazine and carrying said the disk onto said disk loading face; said magazine comprising:
- a magazine body having a plurality of partitions arranged in order along a direction roughly perpendicular to said disk loading face;
- a plurality of plate-shaped trays respectively arranged between the partitions, each tray supporting a disk on its principal surface and rotating in between disk protruding and receiving positions along a principal surface thereof relative to said magazine body; and
- holding means for holding each tray in said disk receiving position, said holding means having a first opening formed in each partition, a second opening formed opposite to said first opening, a plurality of moving pieces disposed between said first and second openings and made movable along the direction where said partitions are arranged, means for moving said moving pieces close to each other, and means for pressing each tray toward the position where the tray is received, said means for pressing the tray comprising a presser lever with one end oscillatingly attached to said magazine body and the other end composed of the presser lever smoothly mating with the free end of each tray and means for supplying said presser lever with force for pressing each tray, said presser lever being provided with a boss for oscillating said presser lever body toward the position where each tray is received by abutting the fixed portion of said loader when said magazine is projected from said loader.

6. A multidisk player for playing disks, said player comprising:

a housing;

playback means for reproducing signals recorded on said disks, said playback means having a disk loading face against which said disks are pressed for playing;

a magazine for holding a plurality of disks arranged in order;

a magazine loader within which said magazine is detachably fitted; and means for detecting whether said magazine is loaded on said magazine loader, disk carrier means for selecting any one of the disks in said magazine and carrying said disk onto said disk loading face, said means for detecting whether said magazine is loaded comprising a moving lever movably installed in the direction where the magazine is installed and moving when said magazine mates therewith, and a pair of detecting switches mating with said moving lever and moving in response to movement of said moving lever.

* * * * *